United States Patent [19]
Kolarov et al.

[11] Patent Number: 6,144,773
[45] Date of Patent: Nov. 7, 2000

[54] WAVELET-BASED DATA COMPRESSION

[75] Inventors: Krasimir D. Kolarov, Menlo Park; William C. Lynch, Palo Alto; Peter Schröder, Pasadena, all of Calif.; Wim Sweldens, Summit, N.J.

[73] Assignee: Interval Research Corporation, Palo Alto, Calif.

[21] Appl. No.: 08/607,388

[22] Filed: Feb. 27, 1996

[51] Int. Cl.[7] ............................. G06K 9/36; G06F 17/15
[52] U.S. Cl. ...................... 382/240; 382/248; 364/725.05
[58] Field of Search ................................... 382/240, 248; 364/724.04, 724.14, 725.01, 725.02

[56] References Cited

U.S. PATENT DOCUMENTS

| | | | |
|---|---|---|---|
| 4,155,097 | 5/1979 | Lux | 358/135 |
| 4,190,861 | 2/1980 | Lux | 358/135 |
| 5,014,134 | 5/1991 | Lawton et al. | 358/261.3 |
| 5,068,911 | 11/1991 | Resnikoff et al. | 382/56 |
| 5,101,446 | 3/1992 | Resnikoff et al. | 382/56 |
| 5,124,930 | 6/1992 | Nicolas et al. | 364/485 |
| 5,148,498 | 9/1992 | Resnikoff et al. | 382/54 |
| 5,262,958 | 11/1993 | Chui et al. | 364/487 |
| 5,272,478 | 12/1993 | Allen | 341/107 |
| 5,287,529 | 2/1994 | Pentland | 395/800 |
| 5,315,670 | 5/1994 | Shapiro | 382/56 |
| 5,321,776 | 6/1994 | Shapiro | 382/56 |
| 5,359,627 | 10/1994 | Resnikoff | 375/34 |
| 5,363,099 | 11/1994 | Allen | 341/107 |
| 5,381,145 | 1/1995 | Allen et al. | 341/107 |
| 5,384,725 | 1/1995 | Coifman et al. | 364/807 |
| 5,412,741 | 5/1995 | Shapiro | 382/232 |
| 5,414,780 | 5/1995 | Carnahan | 382/276 |
| 5,929,860 | 7/1999 | Hoppe | 345/419 |

OTHER PUBLICATIONS

"Image coding using wavelet transform", by Antonini et al., IEEE trans. On Image Processing, vol. 1, No. 2, Apr. 1992.
Hoppe et al. (Hoppe), "Mesh optimization", Siggraph 1993.
IPEA, International Preliminary Examination Report, May 27, 1998, EPO.
IPEA, Written Opinion (PCT Rule 66) EPO, Munich, Germany. Feb. 25, 1998.
M.H. Gross, et al., Fast Multiresolution Surface Meshing, 1995, IEEE.

(List continued on next page.)

*Primary Examiner*—Amelia Au
*Assistant Examiner*—Martin E. Miller
*Attorney, Agent, or Firm*—Beyer & Weaver, LLP

[57] ABSTRACT

A technique for compression and expansion of a function defined upon an M-dimensional manifold embedded in N-dimensional space uses a second generation wavelet transform and a modified zerotree bit-encoding scheme. Typically, a function is defined upon a two-dimensional manifold embedded in three-dimensional space, such as a sphere. A geometric base is chosen as a coarse initial model of the manifold. Second generation wavelets for the function are calculated using a triangular subdivision scheme in order to subdivide the geometric base in order to produce a refined triangular mesh. The wavelet coefficients are defined at the vertices of the triangles in the triangular mesh. A tree structure is created in which each node of the tree structure represents an associated triangle of the triangular mesh. Each triangle in the mesh is recursively subdivided into four subtriangles and each associated node in the tree structure also has four children, which correspond to the four subtriangles. Each wavelet coefficient defined at a particular vertex in the triangular mesh is uniquely assigned to a single one of the triangles at a next higher level of subdivision, such that each triangle at the next higher level of subdivision has from zero to three assigned wavelet coefficients. Using a modified zerotree encoding scheme, values of the wavelet coefficients are processed bit plane by bit plane, outputting bits indicative of significant nodes and their descendants. Sign bits and data bits are also output. An expansion technique inputs bits according to the modified zerotree scheme into the tree structure in order to define wavelet coefficients. An inverse second generation wavelet transform is used to synthesize the original function from the wavelet coefficients.

34 Claims, 15 Drawing Sheets

OTHER PUBLICATIONS

Geoffrey Dutton, Locational Properties of Quaternary Triangular Meshes, 1990, Proceedings of the 4th International Symposium on Spatial Data Handling.

Peter Schröder, et al., Spherical Wavelets: Efficiently Representing Functions on the Sphere, 1995, Computer Graphics Proceedings, Annual Conference Series.

Leila De Floriani, et al., Hierarchical Triangulation for Multiresolution Surface Description, Oct. 14, 1995, ACM Transactions on Graphics, vol. 14, No. 4.

György Fekete, et al., Sphere quadtrees: a new data structure to support the visualization of spherically distributed data, 1995, SPIE, vol. 1259. Abstract only—pages missing.

David Abel, et al., Advances in Spatial Databases, Jun. 1993, Third International Symposium.

"The research group directed by Prof. Tony DeRose at the University of Washington is currently conducting research concerned with the efficient representation of polygonal models with complicated geometry." Sep. 1995.

Geometric Compression Through Topological Surgery, Jan. 18, 1996, Presented at Stanford University.

Amir Said, A New Fast and Efficient Image Codec Based on Set Partitioning in Hierarchical Trees, May 1993, IEEE Int. Symp. on Circuits and Systems.

Said, et al., Image Compression Using the Spatial–Orientation Tree, 1993, IEEE.

Schroder, et al., Spherical Wavelets: Efficiently Representing Functions on the Sphere, University of South Carolina.

Stephane G. Mallat, Multiresolution Approximations and wavelet orthonormal bases of $L^2(R)$, Sep. 1989, Transactions of the American Mathematical Society, vol. 315, No. 1.

Cohen, et al., Biorthogonal Bases of Compactly Supported Wavelets, 1992, Communications on Pure and Applied Mathematics, vol. XLV, 485–560.

Ingrid Daubechies, Orthonormal Bases of Compactly Supported Wavelets, 1988, Communications on Pure and Applied Mathematics, vol. XLI 909–996.

Wim Sweldens, The Lifting Scheme: A Custom–Design Construction of Biorthogonal Wavelets, Nov. 1994 (revised Nov. 1995).

Jerome M. Shapiro, Embedded Image Coding Using Zerotrees of Wavelet Coefficients, Dec. 1993, IEEE, vol. 41, No. 12.

Schroder, et al., Spherical Wavelets: Texture Processing, pp. 1–11.

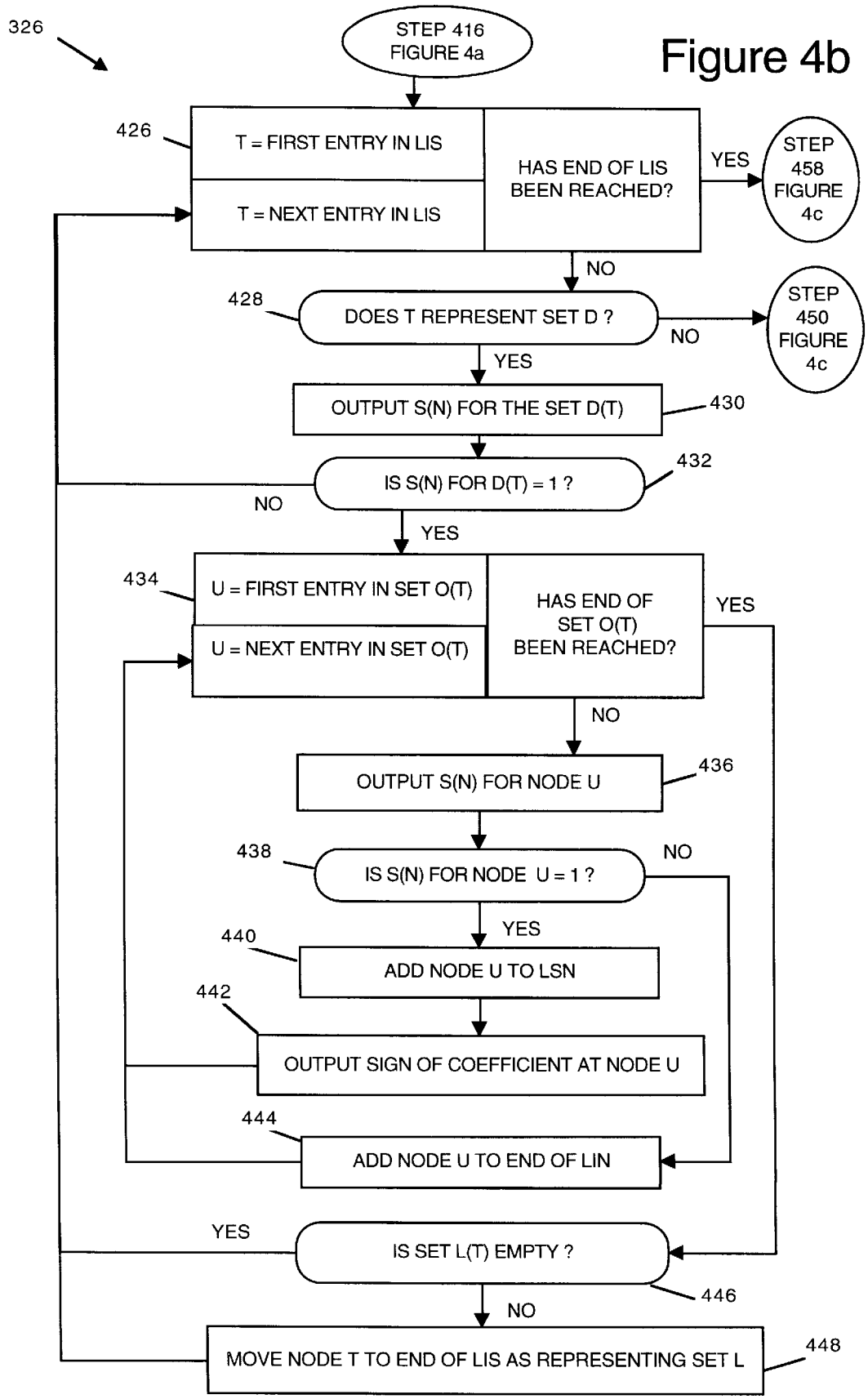

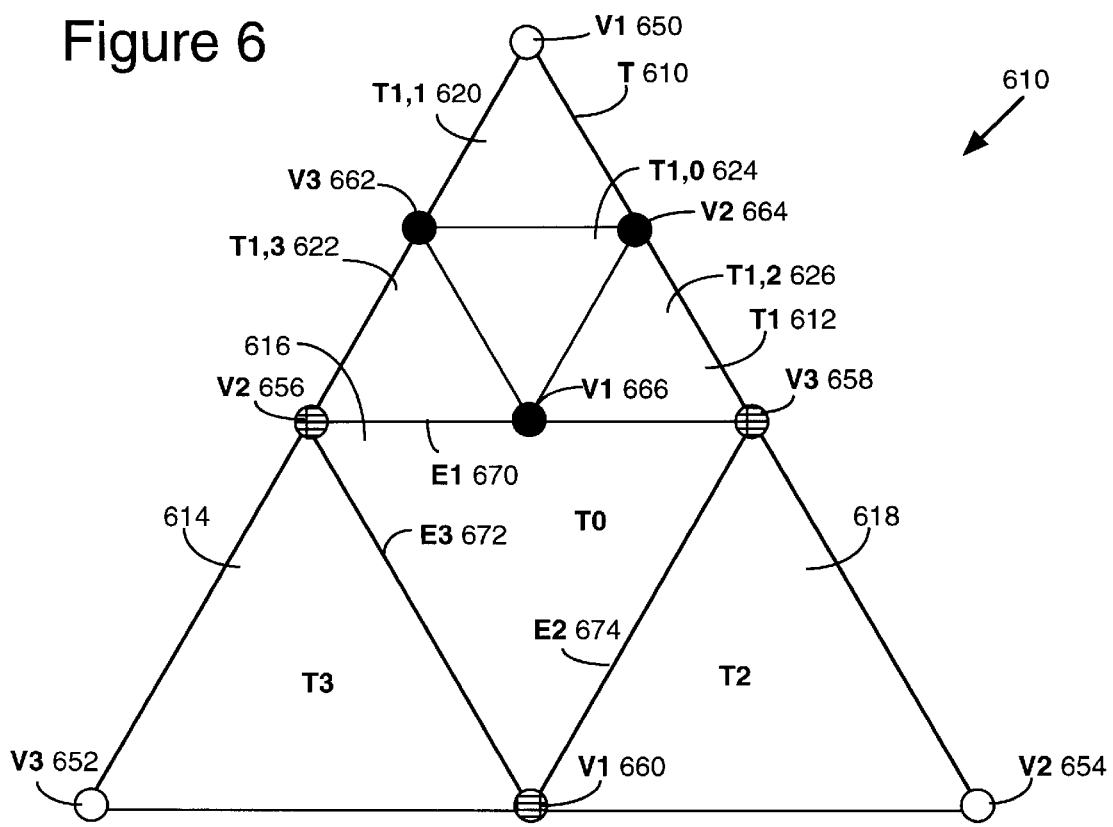

WAVELET-BASED DATA COMPRESSION

FIELD OF THE INVENTION

The present invention relates generally to the compression of data defined on complex geometries. More specifically, a compression technique that is adapted to compress data defined using a wavelet transformation is described.

BACKGROUND OF THE INVENTION

Data compression techniques are useful to represent information as accurately as possible with a minimum number of bits in order to minimize the amount of data that must be stored or transmitted for use in a computer system. Typically, data to be compressed may represent various types of information, such as audio and video information. One of the means primarily used for compressing data is the removal of redundant information. At the same time, however, the remaining information must accurately represent the data that has been compressed.

Typically, the compression of data involves three steps. In a first step, the data is transformed in order to reduce its size and to separate detail. A wide variety of transformation techniques are currently in use. By way of example, a transformation technique such as a discrete cosine transform is commonly used. In a second step the data is quantized. That is, the data is scaled and truncated appropriately. Truncation is preferably used only to discard information having detail that is not required by the user of the data. For example, in an image to be compressed, if there are pixels that the human eye could not perceive in the resulting image, these pixels may be discarded. In a third step, the data remaining after the quantization step is bit encoded using a suitable entropy encoding technique. This entropy encoding step further compacts the data by efficiently representing the bits in the data. For example, redundant bits may be discarded. Any suitable entropy encoding technique may be used. By way of example, common entropy encoding techniques include Huffman, arithmetic, binary, run-length, LZ and LZW encoding.

Traditional data compression methods work on data defined on simple geometries. Typical geometries used in conventional compression methods include: the real line (e.g., audio), a rectangle (e.g., images), or a three-dimensional raster (e.g., video). However, these conventional data compression technologies are not suitable for compression of data defined on higher-dimensional or complex geometries such as spheres, general polygonal models, etc.

There are numerous examples of complex geometries for which it would be useful to develop an appropriate data compression technique. One example is Earth data compression. At the moment very large data sets of Earth elevation data exists. A typical example is the ETOPO5 data set. This data set represents topographic data over the entire Earth. The data gives the elevation (depth) of the Earth from sea level in meters at a resolution of 5 arc minutes at the equator. Even with powerful workstations, manipulating, storing, and transmitting such data sets can be quite expensive. Other examples of similar data sets are satellite views of the face of the Earth and planetary data.

Another example of a complex geometry that is useful for modeling information is the human head. Current video telephone technology takes advantage of the fact that one of the most common image types that is transmitted during video conferencing is images of human heads. One technique used to reduce the amount of information transmitted contemplates first transmitting a three-dimensional (3-D) model of a person's head and thereafter only transmitting information indicative of subsequent head movements. A data compression technique suitable for speeding up the transmission of the original 3-D head models would therefore be desirable. Other areas of application that use head models include animation and multimedia.

Another relevant application is the interactive multi-resolution viewing of complex data sets. When building an interactive viewer for complex manifolds, it would be desirable to only store and display the information needed by the user. For example, if the user needs a global view of the data, a low resolution approximation may be used. When the user focuses on a particular area, a higher level of detail can be loaded and displayed in real time. A further example is the interactive multi-resolution processing and editing of surfaces. A user might wish to change a global feature of a complex 3-D model while keeping the finer resolutions unchanged. On the other hand, a user may wish to edit the finer details while keeping the coarser levels unchanged. In other words, it is desirable to provide a facility for interactively building and editing complex 3-D models. Such techniques have applications in computer graphics and modeling.

While various techniques are available in the prior art for compression of the simple geometries, no unified technique currently exists for the compression of data defined on complex and/or higher dimensional geometries. Accordingly, the present invention seeks to provide such a technique.

In recent years the use of a mathematical construct referred to as wavelets to model complex data has become increasingly popular. The basic idea of wavelets and wavelet transforms were developed in the eighties. See I. Daubechies, "Ten Lectures on Wavelets," CBMS-NSF Regional Conf. Series in Appl. Math., Vol. 61, Society for Industrial and Applied Mathematics, 1992; S. G. Mallat, "Multiresolution Approximations and Wavelet Orthonormal Bases of $L_2$ (R)", Trans. Amer. Math. Soc., 315(1):69–87, 1989; and Y. Meyer, "Ondelettes et Opérateurs, I: Ondelettes, II: Operateurs de Calderón-Zygmund, III: (with R. Coifman), Opérateurs multilinéaires," Hermann, 1990. English translation of first volume, "Wavelets and Operators", is published by Cambridge University Press, 1993.

One definition of a wavelet is: "Wavelets are building blocks that can quickly decorrelate data." This sentence incorporates the three main features of wavelets. First of all, they are building blocks for general sets of functions. Mathematically it can be said that wavelets form a basis. This means that each element of a general class may be written in a stable way as a linear combination of the wavelets. Secondly, wavelets have the power to decorrelate smooth functions. This means that the representation of the data in terms of the wavelet coefficient is somehow more "compact" than the original representation. The entropy in the wavelet representation is smaller than in the original representation. The decorrelation power follows from the fact that the wavelets already in some way resemble the data to be represented. Many signals have both correlation in space and frequency. Indeed, samples that are spatially close are more correlated than ones far apart, and frequencies often occur in bands. Wavelets are also local in space and frequency. Finally, the wavelet representation of a data set can be found quickly. More precisely, one can switch between the original representation of the data and its wavelet representation in a time proportional to the size of the data. The fast decorrelation power of wavelets is one key to compression applications.

In general, wavelets are basis functions that represent a given function at multiple levels of detail. Due to their local support in both space and frequency, they are suited for the sparse approximations of functions. Locality in space follows from their compact support, while locality in frequency follows from their smoothness and vanishing moments. In the classic wavelet setting, i.e., on the real line, wavelets are defined as the dyadic translates and dilates of one particular, fixed function. They are typically built with the aid of a scaling function. Scaling functions and wavelets both satisfy refinement relations (or two scale relations). This means that a scaling function or wavelet at a certain level of resolution (j) can be written as a linear combination of scaling basis functions of the same shape but scaled at one level finer (level j+1).

Over the last decade wavelets have become an exceedingly powerful and flexible tool for computations and data reduction. They offer theoretical characterizations of smoothness, insights into the structure of functions and operators, and practical numerical tools that lead to faster computational algorithms. Examples of their use in computer graphics include surface and volume illumination computations, curve and surface modeling and animation, among others. Given the high computational demand in the quest for speed in computer graphics, the increasing exploitation of wavelets comes as no surprise. While these and other applications can benefit greatly from wavelet techniques, some of these applications can provide new challenges to the underlying wavelet technology. One such challenge is the transformation of data defined on complex manifolds. In general, an M-dimensional manifold is a space N such that each point in N has a neighborhood homeomorphic to an open ball in R to the M power. For example, a two-dimensional (2-D) spherical surface embedded in Euclidean three-dimensional (3-D) space is such that each small portion of the sphere appears to be the same as a small portion of Euclidean 2-D space (i.e., the plane). This fact caused some people to believe that the Earth was flat.

Classic wavelet constructions define the wavelet functions as dyadic translates and dilates of one fixed function: "the mother wavelet." See, for example, C. K. Chui, "An Introduction to Wavelets," Academic Press, 1992; A. Cohen, I. Daubechies, and J. Feauveau, "Bi-orthogonal Bases of Compactly Supported Wavelets," Comm. Pure Appl. Math., 45:485–560, 1992; and I. Daubechies, "Orthonormal bases of compactly supported wavelets," Comm. Pure Appl. Math,. 41:909–996, 1988. Because translation and dilation only make sense in a flat Euclidean space, these classical, or first generation wavelets cannot be used for the transformation of data defined on more complex manifolds. Therefore, one needs to consider the generalization to second generation wavelets. These are wavelets that are not necessarily the translates and dilates of one function, but that still enjoy all the powerful properties of first generation wavelets, namely basis properties, decorrelation power, and fast algorithms. In general, it can be said that most all of the widely used classical wavelets may be represented using second generation wavelets, and it is believed that all classical wavelets may be so represented. In other words, second generation wavelets are a superset of most all classical wavelets. Thus, the term "second generation wavelets" as used herein refers not only to the specific second generation wavelets described, but also to those classical wavelets that may be represented using second generation wavelets.

The basic philosophy behind second generation wavelets is to build wavelets with all desirable properties (localization, fast transform) adapted to much more general settings than the real line, e.g., wavelets on manifolds. In order to consider wavelets on a surface, one needs a construction of wavelets that are adapted to a measure on the surface. In the case of the real line (and classical constructions) the measure is dx, the usual translation invariant Lebesgue measure. For a sphere, the usual area measure can be denoted by dw, for example. Adaptive constructions rely on the realization that translation and dilation are not fundamental to obtain the wavelets with the desired properties. The notion that a basis function may be written as a finite linear combination of basis functions at a finer, more subdivided level, is maintained and forms the key behind the fast transform. The main difference with the classical wavelets is that the filter coefficients of second generation wavelets are not the same throughout, but can change locally to reflect the changing (non-translation invariant) nature of the surface and its measure.

Classical wavelets and the corresponding filters are constructed with the aid of the Fourier transform. The underlying reason is that translation and dilation become algebraic operations after the Fourier transform. In the setting of second generation wavelets, translation and dilation can no longer be used, and the Fourier transform cannot be used as a construction tool. An alternative construction is provided by the lifting scheme.

This new concept in the construction of wavelets, the lifting scheme, has been introduced recently. This concept is described in W. Sweldens, "The Lifting Scheme: A Custom-design Construction of Biorthogonal Wavelets", Technical Report 1994:7, Industrial Mathematics Initiative, Department of Mathematics, University of South Carolina, 1994, which is incorporated herein by reference in its entirety. This lifting scheme differs from the classical constructions in the sense that it does not need to use Fourier transforms. Therefore, it is an excellent tool for the construction of second generation wavelets. In one implementation, triangular subdivision is used to model a three-dimensional manifold, such as a sphere. Such a triangular subdivision of a sphere 200 is generally illustrated in FIG. 2a. In this figure the surface of sphere 200 has been subdivided into triangles in the form of a geodesic sphere. Shown is a triangle 210 that represents one of the many triangles on the surface of the sphere. Note that triangle 210 itself forms a part of a larger triangle that is represented by triangles 211, 210, 212 and 213. It should also be noted that triangle 210 itself may be further subdivided according to the same scheme.

While modeling techniques that utilize second generation wavelets to represent data on complex manifolds have proven useful, working with such data can be extremely difficult since the amount of data required for modeling can be extremely large, and presently, there are no suitable mechanisms for compressing such data. Accordingly, the development of a compression arrangement suitable for compressing such data would be highly desirable.

SUMMARY OF THE INVENTION

The present invention embodies a compression technique for compressing and uncompressing data representing a function defined upon an M-dimensional manifold embedded in N-dimensional space. With an M-dimensional manifold, a geometric base type is used as a coarse initial model of the manifold and the geometric base is subdivided into cells. Second generation wavelet coefficients for the function are generated using a subdivision scheme in order to subdivide the geometric base into cells. The coefficients are defined upon the cells.

The invention may also compress and uncompress a function defined upon a two-dimensional manifold, where the manifold is embedded in three-dimensional space. In one aspect of compression, second generation wavelets for the function are generated using a triangular subdivision scheme in order to subdivide the geometric base in order to produce a refined triangular mesh. The wavelet coefficients are defined at the vertices of the triangles in the triangular mesh. A tree structure is created in which each node of the tree structure represents an associated triangle of the triangular mesh. Each triangle in the mesh is recursively subdivided into four subtriangles and each associated node in the tree structure also has four children, which correspond to the four subtriangles. Each wavelet coefficient defined at a particular vertex in the triangular mesh is uniquely assigned to a single one of the triangles at a next higher level of subdivision, such that each triangle at the next higher level of subdivision has from zero to three assigned wavelet coefficients.

In order to compress the wavelet coefficients, the values of the wavelet coefficients are processed bit plane by bit plane, by stepping through the nodes of the tree structure. A first threshold is set, and a stream of bits is output indicative of significant nodes. A significant node is defined as a node that has either an associated wavelet coefficient that exceeds the designated threshold or a descendant node that has an associated wavelet coefficient that exceeds the designated threshold. When a particular significant node is determined, the significant children are recursively examined for significant descendants and the output bit stream identifies the significant descendants and the significant children nodes. After all nodes have been processed in this fashion for this bit plane, a new threshold is set and the next bit plane is processed. The technique continues in this fashion until all bit planes for the wavelet coefficients have been processed.

In a further embodiment, when the sign bit of a wavelet coefficient is encountered, it is also output in the bit stream. Also, in a refinement step, for each node already determined to be significant, and not newly determined to be significant, the bit corresponding to the current bit plane is output for each wavelet coefficient associated with that node. In another embodiment, the output bit stream may be entropy encoded using a technique such as Huffman encoding, binary encoding, arithmetic encoding, run-length encoding, or LZW encoding.

In one embodiment, the manifold is a sphere, and the geometric base type may be an icosahedron, an octahedron, or a tetrahedron. For each of the geometric base types, the calculation of second generation wavelets may use any of a linear, quadratic, cubic or butterfly lifting scheme.

In another embodiment a wavelet coefficient is uniquely associated with a particular triangle according to the following technique. As a coefficient is defined at the vertex of a given triangle, this vertex will be incident upon the midpoint of an edge that is shared by two larger triangles at the next higher level of subdivision. The coefficient will be uniquely associated with one of these two triangles. In one embodiment, all triangles of the mesh are parameterized either clockwise or counter-clockwise, and the coefficient is uniquely associated with one of the larger triangles according to its parametrization.

The present invention also embodies a technique to perform uncompression of a function defined upon a two-dimensional manifold, where the manifold is embedded in three-dimensional space. The invention may also be generalized and apply to an M-dimensional manifold embedded in N-dimensional space. The function may have been compressed using the above described compression technique. The uncompression technique defines a tree structure as described above where each node of the tree structure represents a triangle of the triangular mesh. From zero to three wavelet coefficients may be associated with each triangle in the mesh, although the values for these coefficients will not be assigned until the data is input and uncompressed.

The uncompression technique sets a first threshold and inputs a stream of significance bits indicative of significant nodes of the tree structure. When a particular significant node is determined, the input stream of significance bits further includes bits indicative of the significance of children nodes of the particular significant node and the input bit stream identifies the significant descendants. In addition, also input are a stream of data bits indicative of values for second generation wavelet coefficients, the wavelet coefficients being defined on triangles within the refined mesh. Once the wavelet coefficients have been defined, the technique synthesizes the data representing the function from the wavelet coefficients in order to reconstruct the function defined upon the manifold. A synthesis technique may perform the inverse wavelet transform that was used to calculate the wavelet coefficients.

BRIEF DESCRIPTION OF THE DRAWINGS

The invention, together with further advantages thereof, may best be understood by reference to the following description taken in conjunction with the accompanying drawings in which:

FIGS. 4*a*, 4*b* and 4*c* show a flowchart for a process in which wavelet coefficients represented in a tree structure are compressed and output to a file.

FIG. 6 shows a triangle from the surface of a sphere that is being subdivided in a wavelet transform in accordance with an embodiment of the invention.

DETAILED DESCRIPTION OF THE INVENTION

Figure 1A:
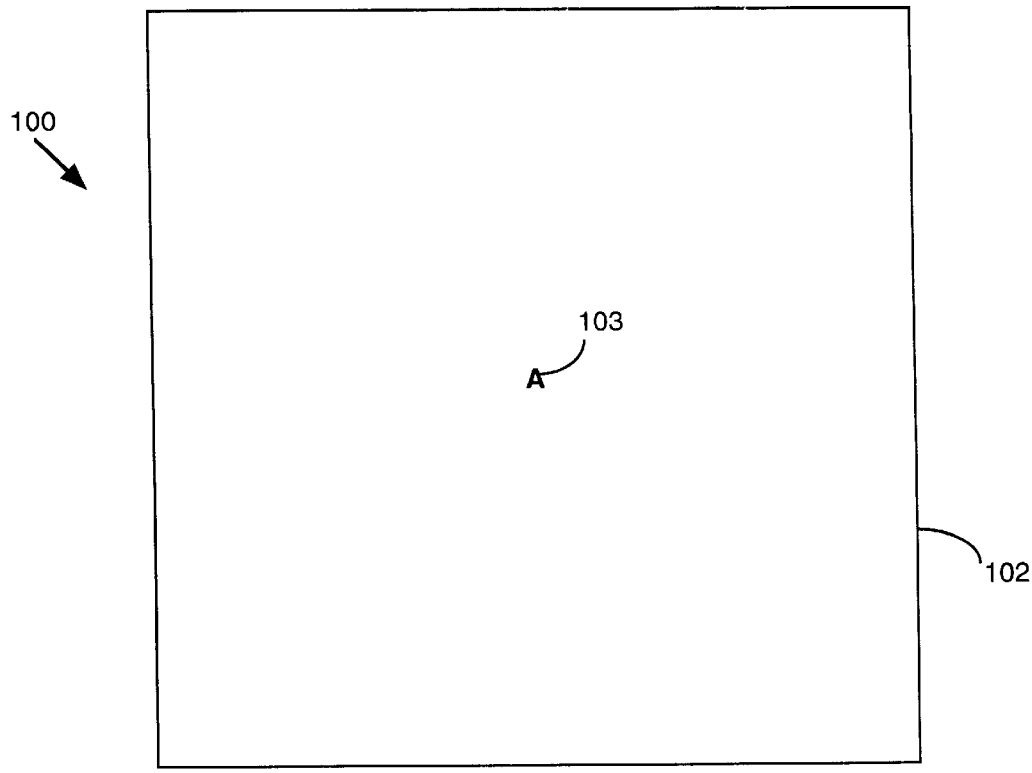
FIG. 1*a* is a symbolic representation of an image undergoing a wavelet transform.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 8:
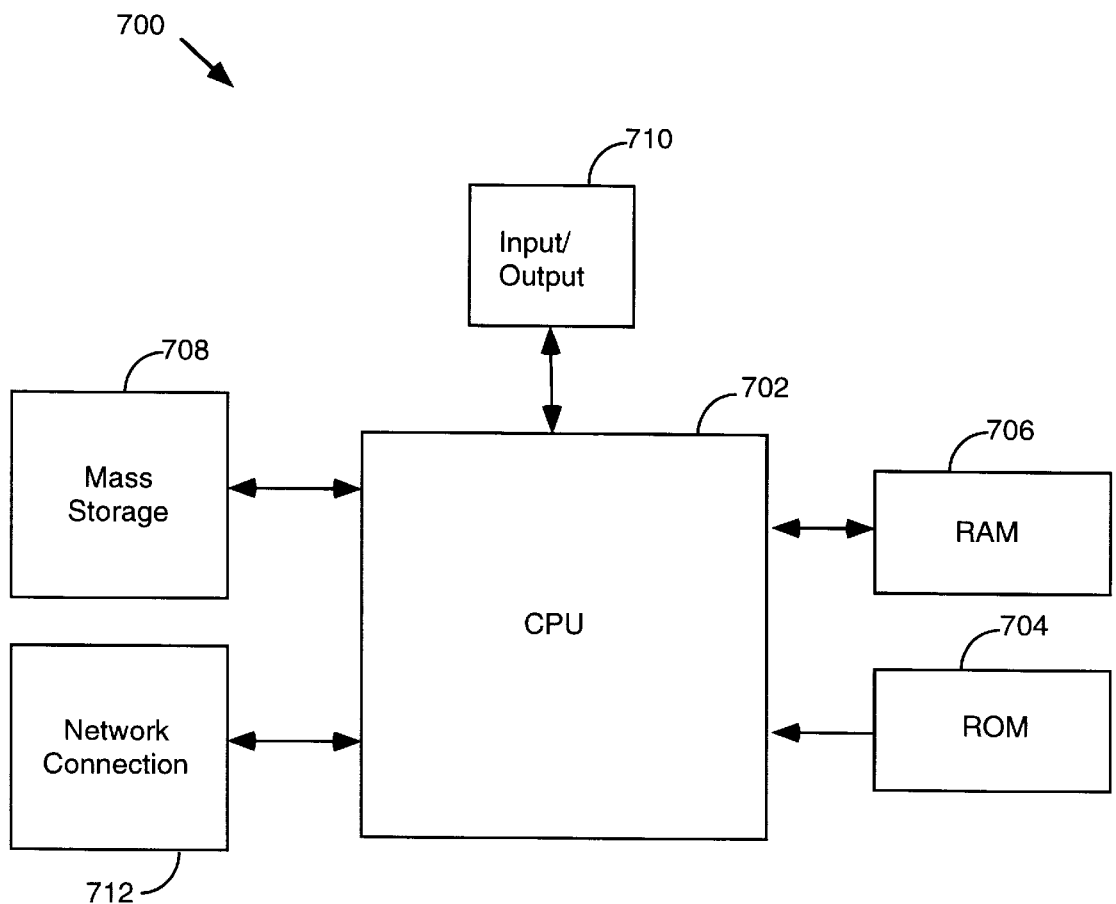
FIG. 8 shows a computer-based system in accordance with an embodiment of the present invention.

Referring next to FIG. 8, a typical computer-based system suitable for implementing the present invention is diagrammatically illustrated. Shown is a central processing unit 702 (CPU) that is coupled to memory devices including read only memory 704 (ROM) and random access memory 706 (RAM). As is well known in the art, ROM 704 acts to transfer data and instructions uni-directionally to the CPU and RAM 706 is used typically to transfer data and instructions in a bi-directional manner. A mass memory device 708 is also coupled bi-directionally to CPU 702 and provides additional data storage capacity. The mass memory device 708 may be used to store programs, data and the like and may take the form of a magnetic or paper tape reader or some other well-known device (e.g., CD-ROM). It will be appreciated that the information retained within the mass memory device 708, may, in appropriate cases, be incorporated in standard fashion as part of RAM 106 as virtual memory. CPU 702 is also coupled to one or more input/output devices 710 (I/O) that include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. The above-described devices and materials will be familiar to those of skill in the computer hardware and software arts.

As discussed in the background portion of this application, data compression techniques typically employ three steps in order to efficiently compress data. These include a transformation step, a quantization step and an encoding step. Two of the present inventors previously developed the lifting scheme described above for modeling data on complex manifolds. The present invention seeks to provide a mechanism for compressing the types of data generated by the lifting scheme (and other similar schemes that utilize second generation wavelets). From the standpoint of compression, the lifting scheme effectively accomplishes the function of the transformation step.

Skipping next to encoding step of the general process for compressing data, a bit encoding technique known as the zerotree algorithm has been used in the past to encode classical wavelets. This zerotree algorithm method to encode wavelet coefficients was first introduced by J. M. Shapiro in "Embedded Image Coding Using Zerotrees of Wavelet Coefficients," 41(12):34453462, IEEE Trans. Signal Process, 1993. This technique has been extended recently by A. Said and W. A. Pearlman in the manuscript "A New Fast and Efficient Image Codec Based on Set Partitioning in Hierarchical Trees", submitted to the IEEE Transactions on Circuits and Systems for Video Technology. A further explanation of this technique can also be found in "Image Compression Using the Spatial-Orientation Tree", A. Said and W. Pearlman, IEEE Report 0-7803-1254-6/93, 1993. Each of these publications is incorporated herein by reference.

Said-Pearlman have proposed a very fast and efficient method to bit encode wavelet coefficients resulting from a conventional wavelet transform. This method and its limitations can best be understood by referring to FIGS. 1a–1d. FIG. 1a is a symbolic representation of an image 100 that has undergone a wavelet transform. Typically, in a wavelet transform an image such as the square 102 is subdivided iteratively and at each level a coefficient is associated with a level of the subdivision. For example, FIG. 1a shows at the coarsest level a square 102 that has had a predicted coefficient value A 103 associated with the whole face of the square 102. Further iterations of the wavelet transform will further subdivide square 102 into smaller and smaller sub-squares until the pixel level is reached. At each level coefficients will be predicted to correspond to the divided sub-squares.

Figure 1B:
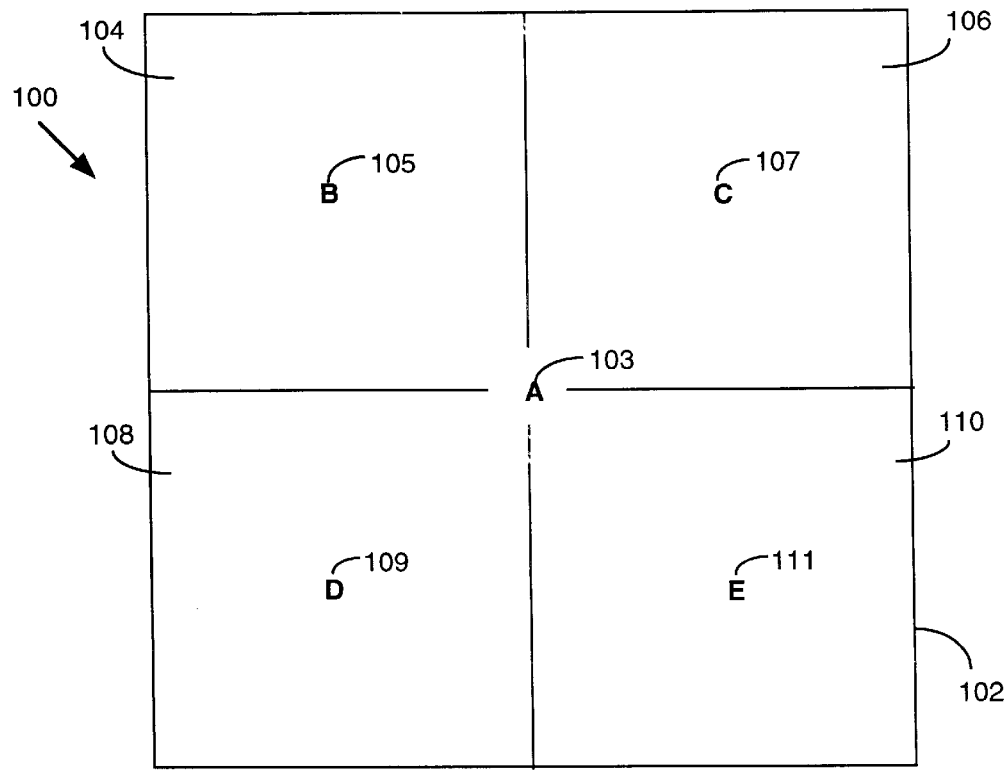
FIG. 1*b* is a symbolic representation of the same image in a further iteration of a wavelet transform.

FIG. 1b shows the next level of iteration of a wavelet transform upon the image 100. In this figure, square 102 has been further subdivided into four equally sized sub-squares. Note that the coefficient A 103 is still associated with the complete face of the square 102 as indicated by its presence in the center of square 102. At this level of iteration, square 102 has been further subdivided into squares 104, 106, 108 and 110. Using the wavelet transform and previously calculated coefficients, new coefficients B 105, C 107, D 109 and E 111 are now associated with the faces of the newly divided sub-squares 104, 106, 108 and 110 respectively. In other words, coefficient A 103 is a predicted coefficient value for the face of square 102 while coefficient B 105 is a predicted value for the square 104. A predicted value might represent the gray scale of a particular square, or at the lowest level, a pixel.

Figure 1C:
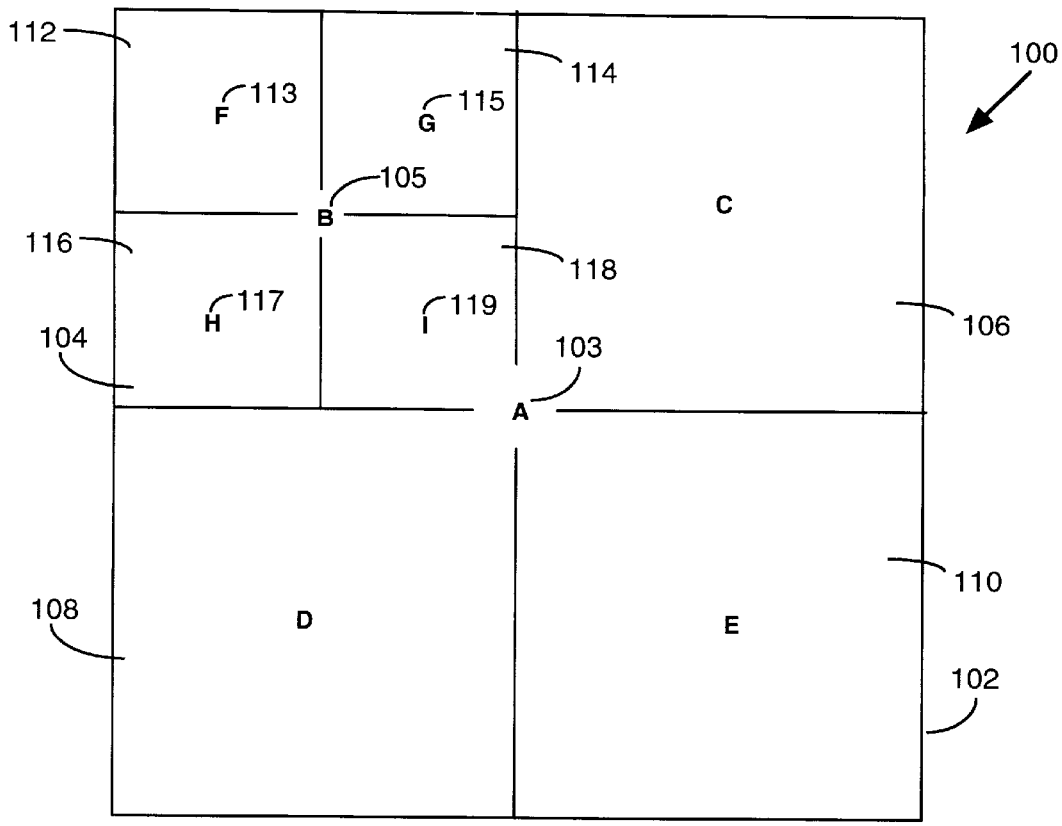
FIG. 1*c* is a symbolic representation of the same image in another iteration of a wavelet transform.

FIG. 1c represents the next level of iteration upon the image 100 using a wavelet transform. FIG. 1c demonstrates how the square 102 that had been subdivided in FIG. 1b is now further subdivided. For example, square 104 has now been subdivided into four sub-squares. These sub-squares are numbered 112, 114, 116 and 118. Associated with the face of each of these smaller sub-squares is a new predicted coefficient, namely F 113, G 115, H 117, and I 119. For example, if square 112 is at the pixel level then it can be said that wavelet coefficient F 113 is associated with the whole face of square 112. Likewise, wavelet coefficient B 105 is associated with the face of square 104 and wavelet coefficient A 103 is associated with the face of square 102. This subdivision process would also be repeated for squares 106, 108 and 110, although not shown.

Figure 1D:
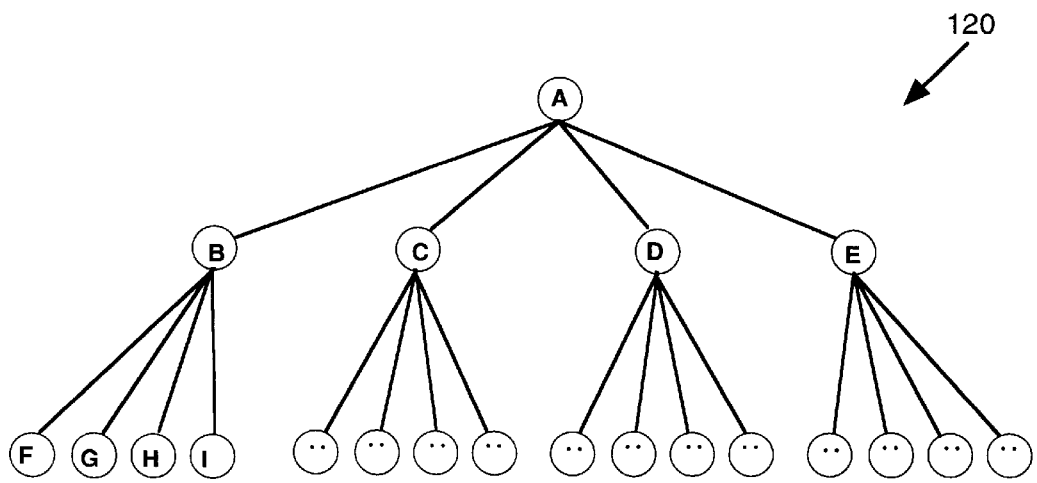
FIG. 1*d* shows a tree structure of wavelet coefficients used to implement the zerotree algorithm.

FIG. 1d shows a tree structure 120 that represents an implementation of the zerotree method described by Said-Pearlman. This tree structure is also referred to as a quad tree or Q-Tree in that the nodes represent squares. The zerotree method first arranges all wavelet coefficients in the Q-Tree. At the root of the Q-Tree are the coefficients on the coarsest level. (Those coefficients at the top level are also referred to as the scale coefficients.) Thus, in our example, coefficient A 103 represents the coarsest level for the square 102, hence, coefficient A 103 is at the root of the Q-Tree 120. Each coefficient would then have four "children" namely the coefficients of the next finer scale of resolution that live at the same location. Thus the children of node A will be the coefficients B 105, C 107, D 109 and E 111. In other words, the children of node A correspond to the next finer subdivision of square 102. As square 102 was subdivided into squares 104, 106, 108 and 110, the coefficients that are associated with each of these subdivided squares form the children nodes of parent node A. Nodes C, D, E would also have children corresponding to a finer subdivision (as for node B), although these children are not shown.

The encoding technique of Said-Pearlman now relies on the fact that in smooth regions of images the coefficients decay exponentially. This implies that if a certain coefficient is below a threshold then its children are very likely to be below the threshold as well. Thus, in this likely case the whole tree of small coefficients may be discarded. For example, if coefficient B is below threshold or close to zero, it is very likely that its children coefficients F, G, H and I will also be below threshold as well.

The Q-Tree 120 of FIG. 1d also implicitly encodes the physical location of the coefficients. For example, because coefficients B, C, D and E are children of coefficient A, it is implicitly known that coefficient B will occupy the top left corner of square 102, coefficient C will occupy the top right corner of square 102, and so on. The zerotree encoding algorithm thus enables the coefficients to be compressed and transmitted without having to also encode each individual coordinate for each coefficient.

However, there are some limitations to this zerotree algorithm if a geometry other than square subdivision is used. For example, if a subdivision scheme based upon triangles is used and it is desired to associate wavelet coefficients with the vertices of triangles, certain problems are encountered. As described above, it is often desirable to use a triangular subdivision scheme when modeling complex geometries. These problems will now be discussed in reference to FIGS. 2a, 2b and 2c.

Figure 2A:
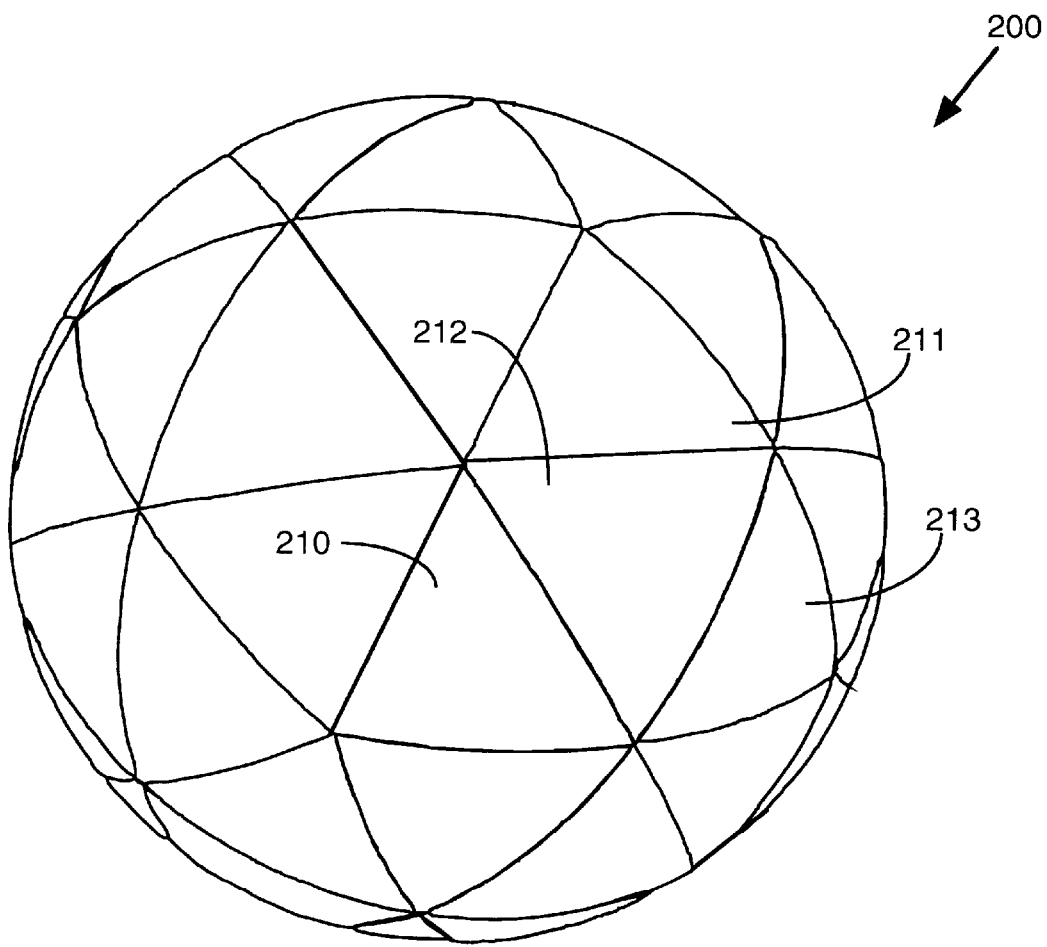
FIG. 2*a* shows a spherical object whose surface has been subdivided into triangles according to a geodesic subdivision scheme.

FIG. 2a shows a sphere 200 that is the subject of data compression using a wavelet transform. For example, sphere 200 might represent the Earth, another planet or a human head. In this figure the surface of sphere 200 has been subdivided into triangles in the form a geodesic sphere. Other types of subdivision with or without triangles are also possible. Shown is a triangle 210 that represents one of the many triangles on the surface of the sphere. Note that triangle 210 itself forms a part of a larger triangle that is represented by triangles 211, 210, 212 and 213. It should also be noted that triangle 210 itself may be further subdivided according to the same scheme.

Figure 2B:
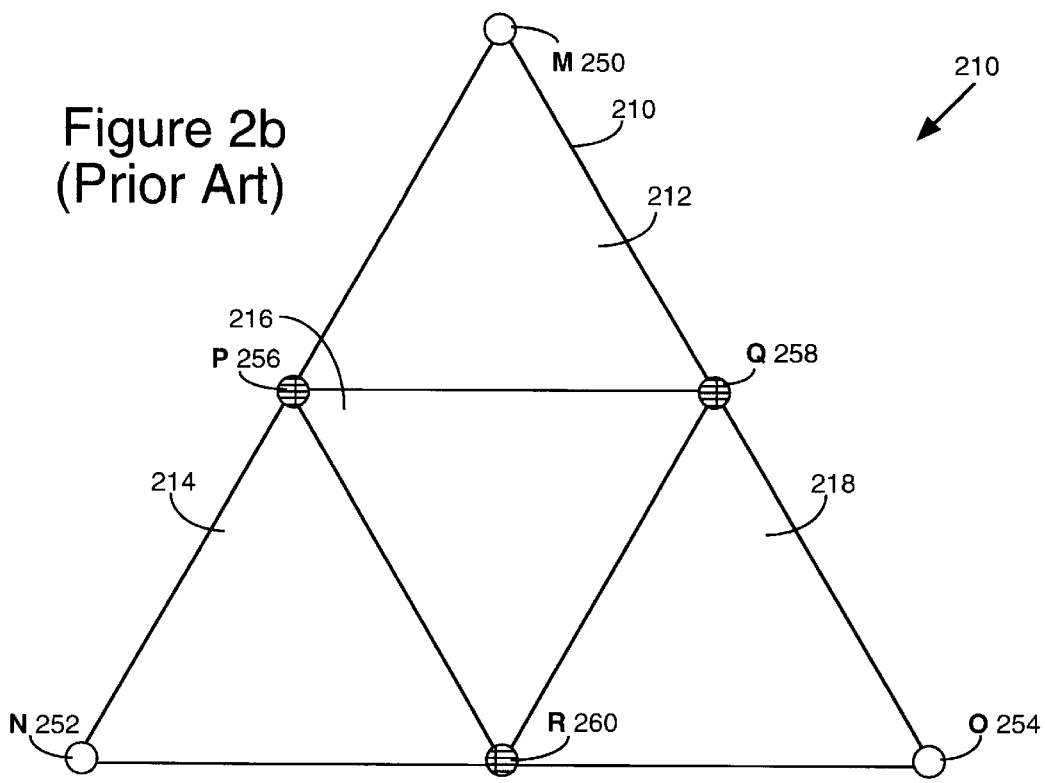
FIG. 2*b* shows a triangle from the surface of the sphere that has undergone a first subdivision as part of a wavelet transform.

FIG. 2b represents a wavelet transformation process in which large triangle 210 is further subdivided into smaller triangles 212, 214, 216 and 218. Because triangle 210 is subdivided into four smaller triangles, the Q-Tree representation scheme of FIG. 1d may be applicable. For example, a wavelet coefficient representing the face of triangle 210 would be at the root of the tree and the four wavelet coefficients corresponding to the faces of smaller triangles 212, 214, 216 and 218 would be the children of this parent wavelet coefficient. This would be a straightforward representation of triangle 210 if the coefficients are associated with the faces of the triangles. However, wavelet coefficients are not necessarily always associated with the faces of shapes such as triangles or squares.

In certain subdivision schemes (for example, subdivision using triangles) it may be desirable to associate the wavelet coefficients not with the face of a given unit but with its vertices. For example, in FIG. 2b, triangle 210 has wavelet coefficients defined at its vertices, namely wavelet coefficients M 250, N 252, and O 254. Thus, triangle 210 and the wavelet coefficients M, N and O represent a first level in a wavelet transform. The next or second level in a wavelet transform is represented by the subdivision of triangle 210 into smaller triangles 212, 214, 216 and 218. At this next level, wavelet coefficients M, N and O may be used to predict the second level coefficients P 256, Q 258 and R 260.

Figure 2C:
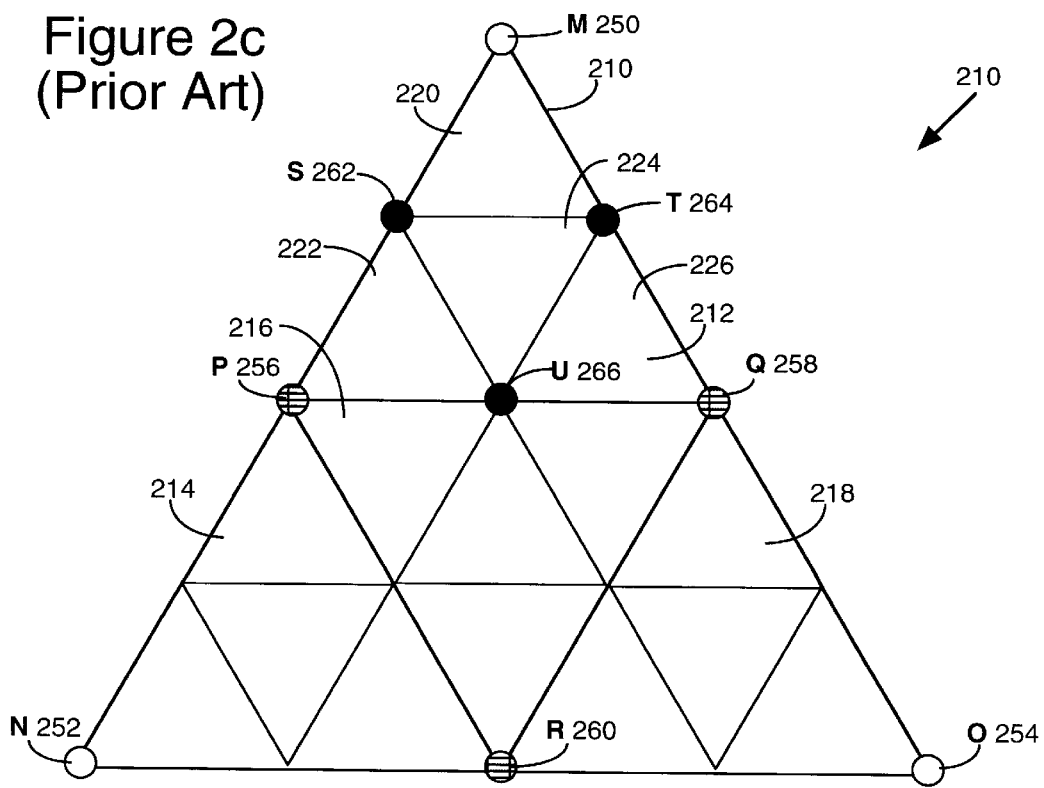
FIG. 2*c* shows a triangle from the surface of the sphere that has undergone a second subdivision as part of a wavelet transform.

Turning now to FIG. 2c, a further subdivision of triangle 210 and a limitation of the zerotree algorithm is shown. In this figure, triangle 210 has been subdivided again. Top triangle 212 has now been subdivided into four smaller triangles 220, 222, 224 and 226. Wavelet coefficients may now be predicted for the new vertices. As wavelet coefficients M, N and O had been used to predict the wavelet coefficients P, Q and R, further prediction occurs similarly. For example, wavelet coefficients M, P and Q have been used to predict wavelet coefficients S 262, T 264 and U 266. Note how the wavelet coefficients S, T and U reside at the vertices of triangle 224.

It is here that a limitation of the zerotree algorithm becomes apparent. For example, if triangle 212 is considered to be a node in the Q-Tree it is unclear which wavelet coefficients should be associated with this node. And it is also unclear which wavelet coefficients should be associated with the children of triangle 212. For example, it can be seen that triangle 212 may conceivably be associated with any of the wavelet coefficients M, S, T, P, U or Q. Further compounding the problem is the fact that triangle 210 cannot be viewed in isolation. For example, referring back to FIG. 2a it can be seen that the topmost wavelet coefficient M of triangle 210 is also shared with triangles 212, 211 and three other triangles. Also, if triangle 220 is one of the four children in the Q-Tree of triangle 212, it is unclear which wavelet coefficients to associate with triangle 220. Wavelet coefficients M, S and T are possibilities, but coefficients S and T reside at different levels in the subdivision scheme than coefficient M. That is, wavelet coefficient M was produced at a first iteration whereas wavelet coefficient S and T were produced at the third iteration. This discrepancy can cause problems in the zerotree algorithm. The problem is that given a vertex wavelet coefficient in the triangle tree there is no way to uniquely assign four children coefficients. This problem is caused by the fact that the wavelet coefficients reside at the vertices of the mesh and not at the faces. Note how this problem does not manifest itself if wavelet coefficients are associated with the faces of a subdivision. Referring back to FIG. 1c, note that square 104 is uniquely associated with wavelet coefficient B and its subdivided squares are uniquely associated with coefficients F, G, H and I and so on. Another problem is that some wavelet coefficients have no children but do have grandchildren. Such a configuration prevents application of the original zerotree algorithm since there is no direct link between a coefficient and its grandchildren.

Figure 3A:
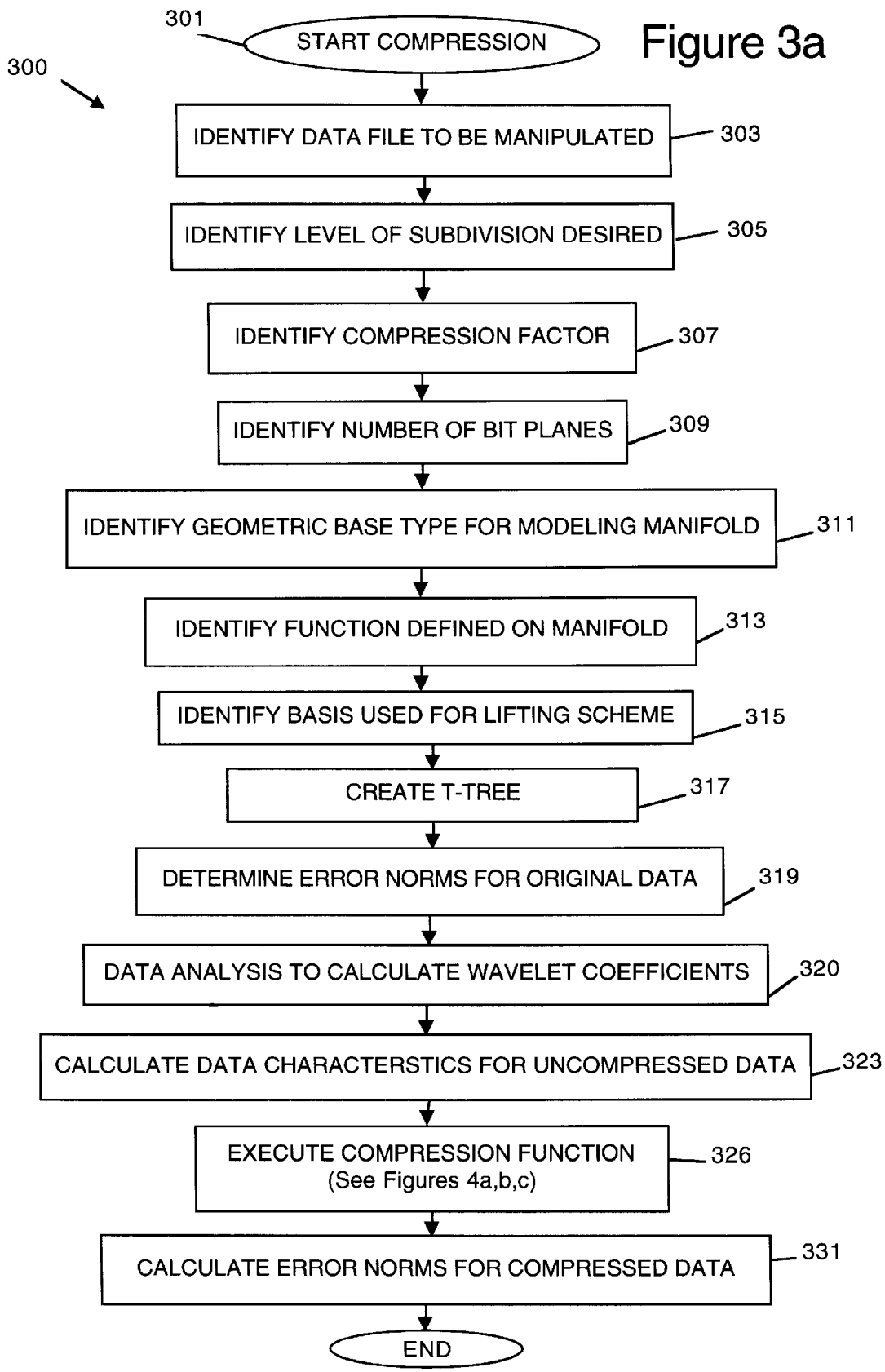
FIG. 3*a* is a flowchart showing a process by which data representing a function defined upon a complex manifold is compressed according to one embodiment of the present invention.
Figure 3B:
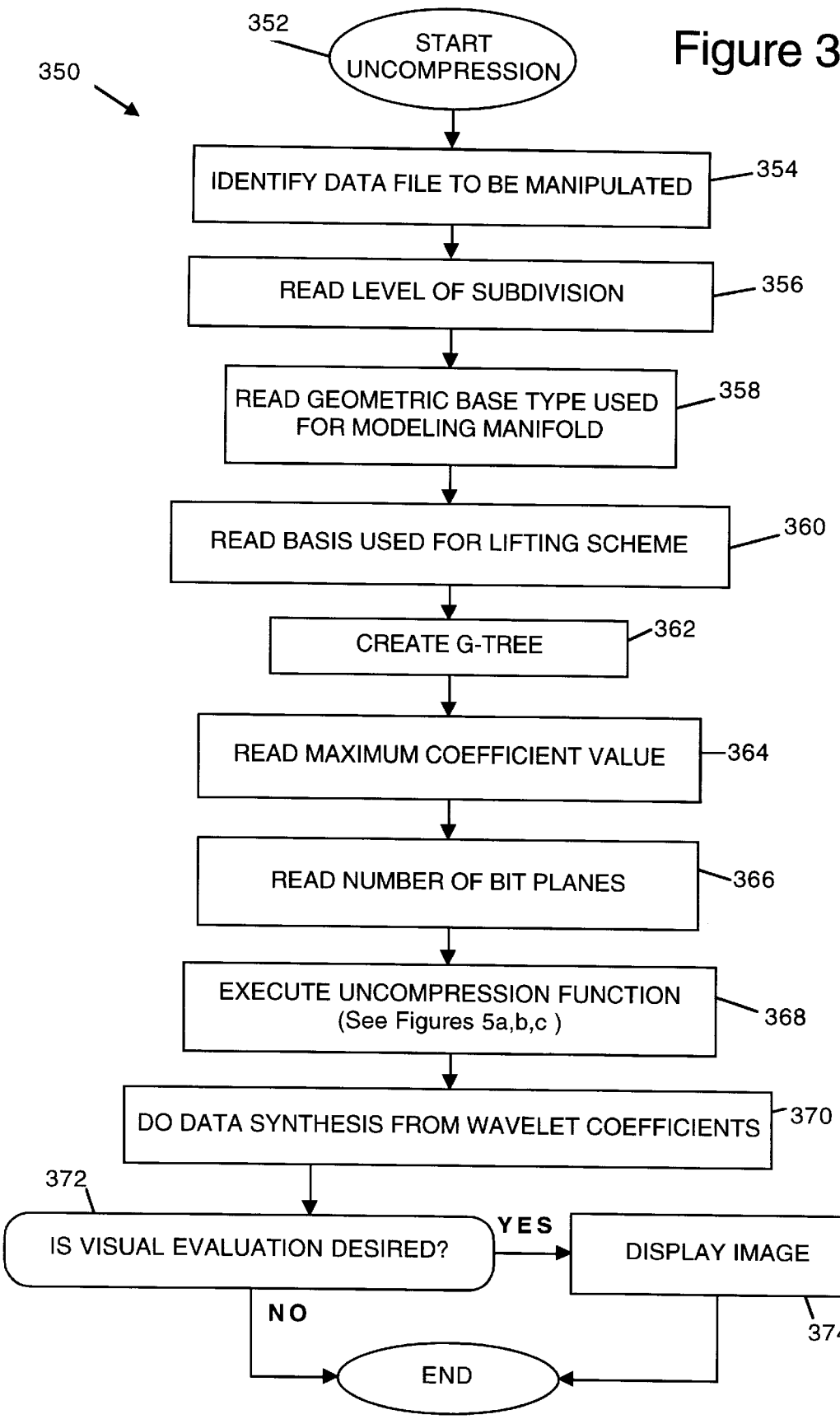
FIG. 3*b* is a flowchart showing a process by which compressed bits in a data file representing a function defined upon a complex manifold are uncompressed according to one embodiment of the present invention.

Referring next to FIGS. 3a and 3b, a method of compressing and uncompressing data in accordance with one embodiment of the invention will be described. The compression method of FIG. 3a will be described first. The procedure begins at step 301. In this step, the user is prompted to input various parameters for use by the procedure. These parameters will be described more fully below with reference to steps 303 to 315. Typically, these parameters, or commands, are input by the user via a command line that is then parsed by the procedure, as in the UNIX operating system. Alternatively, these parameters may be specified by the user via a graphical user interface (GUI), or the parameters may be input via a script file or the like without user interaction. In one embodiment, the invention may be implemented in C++ on a UNIX platform. Graphical visualization may be done, for example, by using the GL library on an SGI workstation.

It is possible for the procedure to operate in an interactive mode. If interactive mode is selected the user is able to specify parameters to control. In the interactive mode, the user would be able to interact with the procedure as subdivision is occurring and the function is being compressed. For example, in the interactive mode the user would be able to perform subdivision iteratively, viewing the results after each iteration, and would also be able to rotate and view the object from a different angle. Other options available to the user in interactive mode are the ability to view the tree structure being formed as a result of the wavelet transformation. If the interactive mode is selected, these options are available to the user as the procedure progresses. The steps of the procedure themselves are not changed, only the way in which the user can view the results.

In step 303 the data file is identified. The data file contains the data for a function defined upon a manifold. It is this function that will be compressed. The data file also contains a representation of the two-dimensional (2-D) manifold itself. The manifold that the function is defined on may be a simple rectangle embedded in the plane, as in a normal photograph, or it may be defined upon a more complex 2-D manifold, such as the spherical surface of the Earth, which cannot be embedded in the plane. The function may be defined in any of a number of ways, including the interpolation of photographic or other sensed data Techniques for this are well known in the art. Intuitively, one may think of the function as being "glued" onto the manifold.

In step 305 the level of subdivision desired is identified. The level of subdivision refers to how many times a triangle in the geometric base type is subdivided into smaller triangles. For example, with reference to FIG. 2a, the sphere 200 has been subdivided at the first level. A second level of subdivision would mean subdividing each of the triangles shown on the sphere 200 into four smaller triangles, as shown in FIG. 2b. The level of subdivision affects the quality of the resulting uncompressed image. For example, a high level of subdivision may increase the quality of the image, but will take longer to process and requires more memory in a computer.

In step 307 the compression factor is identified. The compression factor is the factor by which the data representing a manifold is compressed. For example, a compression factor of four (4) would compress the data by four times (4×). In other words, a data file of 4 Megabytes would be compressed into approximately 1 Megabyte using a compression factor of four (4). A high compression factor produces a smaller compressed data file but may result in a lower quality uncompressed image.

In step 309 the number of bit planes is identified. The concept of a bit plane is known in the art. For example, for a graphic image, it is common to represent each value, or pixel, by 8 bits. Thus, there would be 8 bit planes, numbered zero through seven. The i-th bit plane would contain the i-th bits for each pixel in the image. In another example, an X-ray image may be represented by 12 bits for each value, resulting in 12 bit planes.

In step 311 the geometric base type used for modeling the manifold is identified. It is desirable to choose a geometric base type that approximates the general shape of the object whose image data is being compressed. For example, in compressing a function defined on the surface of the Earth, an icosahedron as the geometric base type works well to approximate the spherical surface of the Earth. For a non-uniform shape, such as an image of a cat, a Dyn sphere works well. Dyn spheres are known in the art and are well suited for "blobby" type objects. For a photograph, a rectangle in the plane as the geometric base type would work best. Any geometric shape as a base type is possible. It would also be possible to define a new geometric type in order to model a unique shape.

In step 313 the function defined on the manifold is identified. The data representation of the function will be compressed. For example, the function may represent elevation, color or gray scale, or any other image characteristics. For an image of the Earth, the function may represent the elevation at a given point on the Earth. In other words, this function may be thought of as both a surface, and as a scalar valued function giving height (depth) for each point on a sphere. Any arbitrary mathematical function is also possible.

In step 315 the linear algebraic basis used for the lifting scheme is identified. A basis may be defined as a method for generating all elements as a linear combination of the basis elements. In the context of second generation wavelets, a basis defines a method for generating new coefficients from previously calculated coefficients. This basis will be used by the lifting scheme (explained more fully below) for a prediction scheme. For example, the basis may be linear, quadratic, cubic or butterfly (Dyn). It is preferable to use a Dyn basis for compressing data representing an image of the Earth. The use by the lifting scheme of a particular basis is explained in the reference "Spherical Wavelets: Efficiently Representing Functions on the Sphere", by P. Schroder, W. Sweldens and presented to SIGGRAPH on Aug. 8, 1995, and is hereby incorporated by reference in its entirety. The use of spherical wavelets for use in the processing of spherical texture maps is described in the reference "Spherical Wavelets: Texture Processing", by P. Schroder, W. Sweldens, *Rendering Techniques*'95, August 1995, published by Springer, and is hereby incorporated by reference in its entirety.

In step 317 a T-Tree is created. This T-Tree (tree of triangles) contains nodes that will represent subdivided triangles of the geometric base type. These subdivided triangles are created in the data analysis step 320 below. The T-Tree is similar to the Q-Tree of FIG. 1*d* that represents subdivided squares, except that the T-Tree is a tree representing triangles. As each triangle is subdivided into four smaller triangles (as shown in FIG. 6, to be explained below), each node in the T-Tree (except for leaf nodes) will have four children nodes that represent the smaller triangles. As such, each node in the T-Tree represents a triangle in the triangular subdivision scheme. A wide variety of methods are possible for creating this tree structure. By way of example, the triangular subdivision scheme shown in the references "Spherical Wavelets: Efficiently Representing Functions on the Sphere" or "Spherical Wavelets: Texture Processing" (both referenced above) may be used to perform subdivision, and the T-Tree will represent this subdivision. A pointer from each node in the T-Tree may be used to reference a data structure that contains information about the represented triangle including its associated wavelet coefficients.

In step 319 the error norms for the original data are determined. The original data is the image data before transformation or compression. Error norms are used to help evaluate the quality of the compression. For example, the maximum and the minimum of the pixel values are calculated to evaluate the quality. Other error norms calculated measure the difference between the original image and the resulting image. Mathematically, this means establishing a metric for measuring distances between images. Metrics for measuring these error norms are known in the art.

In step 320 data analysis is performed to calculate the wavelet coefficients. This is a data transformation step in which the original data is transformed into a second generation wavelet representation, the data then being represented using second generation wavelet coefficients. This step performs the subdivision desired upon the manifold and calculates the wavelet coefficients. A method for performing this transformation is fully described in the reference "Spherical Wavelets: Efficiently Representing Functions on the Sphere", noted above.

In step 323 the data characteristics for the uncompressed data are calculated. These characteristics include the error norms and are used for the purposes of peak signal to noise ratio computation. The calculation for the peak signal to noise ratio may be performed in any manner as is known in the art.

In step 326 the compression function is executed. This function uses a tree based scheme that is somewhat analogous to that disclosed in Said-Pearlman noted above, and is explained more fully below with reference to FIGS. 4*a*, 4*b* and 4*c*. The compression function will compress the wavelet coefficients representing the function defined upon the 2-D manifold. At this point, if a compression file is being written to, the file size before and after compression may be compared and displayed to the user. In step 331 the error norms for the compressed data are calculated. These are the same norms as calculated in step 319, but are calculated after compression for comparison purposes. Next, the compression procedure ends.

At this point, compression has been completed. If compression has been performed for a purpose such as transmitting the data, storing the data or otherwise manipulating the data, then that transmission or storage may be performed at this point and the procedure ends. In some cases, however, the user may wish to proceed directly to the uncompression procedure of FIG. 3*b*. For example, for research, testing or other purposes, it may be desirable to uncompress the data and view the resulting image immediately. In that case, the user would execute the uncompression procedure. Alternatively, if the user begins with or receives compressed data, the user may wish to begin with the uncompression procedure and may not need to perform the compression procedure. Accordingly, the uncompression procedure of FIG. 3*b* will now be described.

The uncompression procedure of FIG. 3*b* begins at step 352. In step 354, the user identifies which data file contains the compressed data. Of course, the data may also be contained in a memory of the computer or may be received in real time over a communication line. When the data had been compressed, certain information useful to compression is saved in the compressed data file. During uncompression, this information is first read from the data file in order to indicate to the uncompression procedure how the data was compressed. This information is read in steps 356, 358, 360, 364 and 366. Of course, if compression is standardized, and this information is known a priori, the uncompression procedure would be able to make assumptions about this information and would not have to read it from a data file. For example, if a decision is made that a tetrahedron will be used for the geometric base type, then the uncompression procedure need not read this information but may assume a tetrahedron.

In step 356 the level of subdivision used for compression is read or received. This level corresponds to the level that was identified in step 305 of the compression procedure. In step 358 the geometric base type used for compression is read or received. This type corresponds to the type that was identified in step 311 of the compression procedure. In step 360 the basis for the lifting scheme used for compression is read or received. This basis corresponds to the basis that was identified in step 315 of the compression procedure.

In step 362 the G-Tree is created to serve as a place holder for the wavelet coefficients that will be read in from the data file using the uncompression step 368 below. This G-Tree may be created as described above in step 404 of FIG. 4*a*, which uses the T-Tree as described in step 317 of FIG. 3*a*.

In step 364 the absolute value of the maximum coefficient calculated is read or received. This value is used, for example, to convert from fixed point to floating point notation. In step 366 the number of bit planes used for compression is read or received. This number corresponds to the number that was identified in step 309 of the compression procedure. After this information has been determined, the uncompression function itself is performed.

In step 368 the uncompression function is executed. This step is fully explained below with reference to FIGS. 5a, 5b and 5c. The uncompression function will take a file of bits that had been previously written out using the compression function and uncompress this information to generate the set of wavelet coefficients that represent the function defined upon the 2-D manifold. Once the coefficients have been generated, a quality analysis may be done. Quality analysis involves calculating again the error norms for the newly uncompressed data, and comparing to the previously calculated error norms in order to determine the quality of the compression.

In step 370 data synthesis is performed on the wavelet coefficients in order to reconstruct as best as possible the data representing the original image. This step is the reverse of step 320 of FIG. 3a, calculating the wavelet coefficients. Data synthesis uses a reverse transform upon the second generation wavelet coefficients to produce the image data. A method for performing this reverse transformation is also described in the above-identified reference "Spherical Wavelets: Efficiently Representing Functions on the Sphere". At this point, the image may be displayed for evaluation.

In step 372 the user is asked if visual evaluation is desired. With an image, it is often possible to roughly evaluate the quality of compression by viewing the image before compression, and then viewing the same image after it has been compressed and then uncompressed. If visual evaluation is not desired, then the uncompression procedure ends. If visual evaluation is desired, control moves to step 374, the image is displayed and then the procedure ends.

Figure 4A:
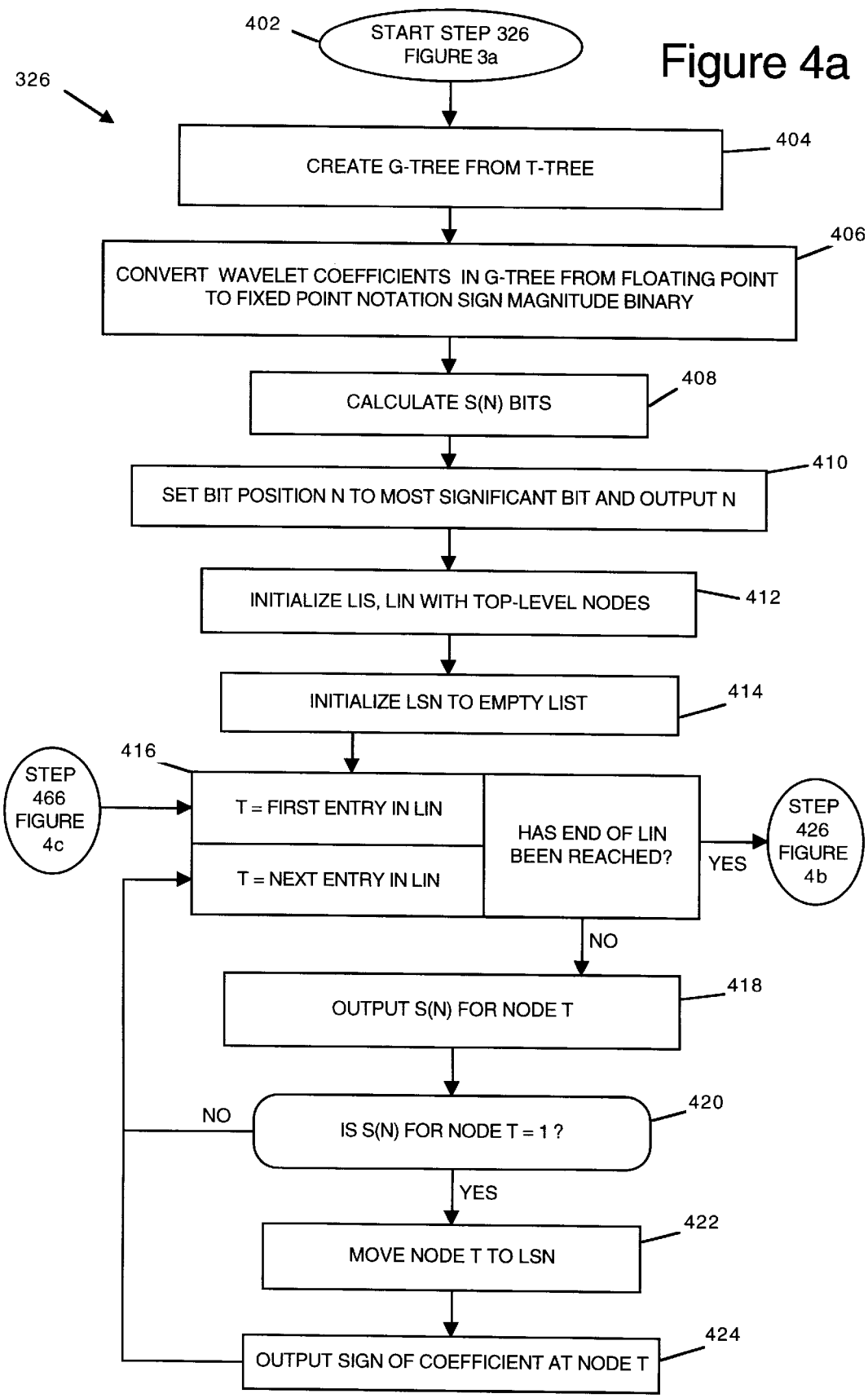
Figure 4C:
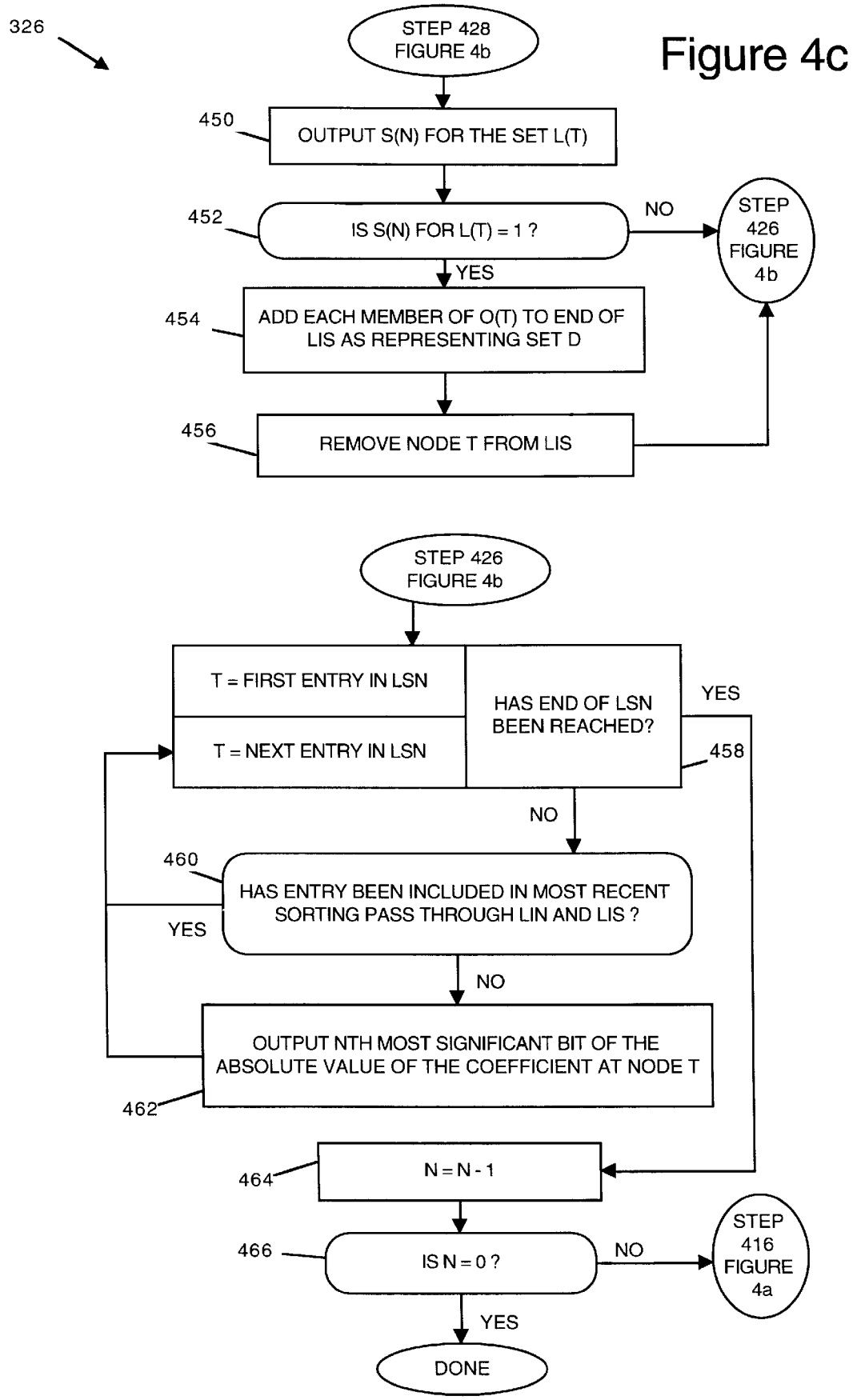

FIGS. 4a, 4b and 4c are a flowchart illustrating one embodiment of the compression function step 326 of FIG. 3a. The function begins in step 402. The compression function used here is analogous to Algorithm II of Said-Pearlman, although it operates upon a geometry tree (or G-Tree) instead of upon a traditional T-Tree as explained more fully below.

In step 404 the G-Tree (geometry tree) is initialized using the T-Tree that was produced by the create T-Tree step 317 of FIG. 3a. The G-Tree is related to, but distinct from the T-Tree. Different schemes for forming a G-Tree are possible. One such scheme is described in detail below with reference to FIG. 6. The G-Tree accommodates triangular meshes of arbitrary two-dimensional manifolds, (for example, the sphere), as contrasted with the purely rectangular system described in Said-Pearlman. In the G-Tree, the coefficients live at the vertices of triangles, and the G-Tree uniquely associates a vertex with one triangle. In the standard T-Tree, coefficients are defined at the vertices of triangles, but it is not immediately obvious how to associate a coefficient with a unique triangle.

In the standard T-Tree coefficients are defined at the vertices of triangles because the analysis step 320 that produces the second generation wavelets creates coefficients that are defined at vertices. Alternatively, however, it would be possible to generate wavelet coefficients that are defined on the faces of triangles, and a corresponding standard T-Tree. In this case, it would not be necessary to initialize a G-Tree, because a wavelet coefficient defined on the face of a triangle may uniquely be associated with that triangle.

In the current embodiment, however, the standard T-Tree represents coefficients that are defined at the vertices of triangles and it is not immediately obvious how to associate a coefficient with a unique triangle. Most vertices have six triangles incident upon them. It is necessary to associate a coefficient with a particular triangle, even though it may appear that a coefficient may be associated with more than one triangle. In other words, the G-Tree will use a tree of subdivided triangles to form its backbone, and vertices (and hence, coefficients) will be associated with a particular triangle in the G-Tree. In the G-Tree, then, a specific triangle is picked out with which to associate a vertex. There will be zero to three vertices mapped to each triangle. The following provides an explanation of how this mapping is done.

In the original Said-Pearlman reference a simple identification was made between sets of coefficients and a single coefficient in the following manner. Each coefficient has three indices, the first being the level of subdivision, where the top of the tetrahedron, i.e., the coarsest level, is numbered zero and finer levels have increasing indices. The second and third indices indicate a spatial position within a given level along the X and Y axis (in that order). The value $\lambda$ is a smooth coefficient and $\chi^*$ represents any of a set of three detail coefficients (since we operate in two dimensions the detail coefficients come in sets of 3, i.e., *=HL, or LH, or HH). Thus, a complete image tetrahedron contains a single $\lambda(0,0,0)$ coefficient at the top and detail coefficients at all finer levels down to some finest level L−1, i.e., $\chi^*(j,k,l)$ with j=0 to L−1 and k and l both =0 to 2(j)−1.

Given this set of coefficients, there is a simple recursive rule by which a given coefficient stands as a representative for all coefficients living in the sub-tree underneath it:

| | | |
|---|---|---|
| $\lambda(0,0,0)$ | enumerates | $\chi HL(0,0,0), \chi LH(0,0,0), \chi HH(0,0,0)$ |
| $\chi^*(j,k,l)$ | enumerates | $\chi^*(j+1,2k,2l), \chi^*(j+1,2k+1,2l),$ |
| | | $\chi^*(j+1,2k,2l+1), \chi^*(j+1,2k+1,2l+1)$ | where "*" stands for one of HL, LH, or HH, which is arbitrary but fixed.

This enumeration scheme has to be changed to accommodate surface based compression schemes in which coefficients live at the vertices of a triangular mesh of a 2-D manifold. There is no simple rule to use a single coefficient to signify both itself and a whole set of descendent coefficients. Thus, the technique of the Said-Pearlman reference has been modified by introducing a way to represent a single coefficient as distinct from a way to represent a set of coefficients reached from a given triangle in the following manner.

A coefficient is given as a pair:

(T,E) where T is a triangle pointer and E is an edge designator.

The coefficient signified by this is the one sitting at the midpoint of the given edge. The special vertices at the top of the hierarchy (4 in the case of the tetrahedron, 8 for the octahedron, and 12 for icosahedron) are not the midpoint of any edge. They also happen to be the only sites where a smooth coefficient is located. They are thus handled separately by simply enumerating them. From then on each coefficient site, or vertex, is the midpoint of some edge.

The first difficulty arises in that a given vertex, being the midpoint of a particular edge, may have two designators:

(T,E) and (τ, E)

where T and τ are the triangles that share the common edge E. This can also be explained by noting that in working with 2-D manifolds an edge is a one-dimensional (1D) sub-manifold and each edge is incident upon either one or two triangles. Because of this a unique way is needed to resolve the ambiguity as to which is the proper designator for a given coefficient. This is done by observing that one of the triangles incident on the edge is parameterized counter-clockwise, while the other by necessity is parameterized clockwise. Because the 2-D manifold is oriented, the base geometry may be parameterized so that every pair of triangles incident upon a common edge have opposite parametrization as to clockwise versus counter-clockwise. With the subdivision and parametrization schemes described below, this property is retained at all subdivision levels.

A clockwise triangle is one in which vertices V1, V2 and V3 are enumerated in a clockwise direction. The proper designator for a given coefficient is the one for which the triangle is labeled counter-clockwise. This rule works correctly throughout the hierarchy except at the edges of the coarsest level, which are 6 for the tetrahedron, 12 for the octahedron, and 30 for the icosahedron. For these edges the ambiguity is resolved by choosing as the only legal designator amongst the two triangles sharing a given such edge, the one triangle with the lower memory address.

Sets of coefficients are now represented by a triangle alone. It represents all triangles that are below it in the hierarchy, i.e., each triangle has 4 constituent children, which themselves have possibly 4 constituent children and so forth to level L−1. The set of coefficients represented by some triangle T is then simply given by all coefficients that as a legal designator have:

($\tau$, E) for some $\tau$ a triangle descendent of the root T.

This representation allows the Said-Pearlman technique to work for data that lives on the vertices of some triangle mesh. The triangle, vertex and edge labeling scheme will now be described in detail with reference to FIG. 6.

FIG. 6 shows a triangle T 610 that represents one of the triangles on the surface of a sphere 200 as shown in FIG. 2a, according to an embodiment of the present invention. Triangle 610 may represent a triangle at the coarsest level, or a triangle at a finer level of subdivision. The large triangle T has been subdivided into four medium triangles, each of that may be further subdivided into smaller triangles. Triangle T has vertices V1 650, V2 654 and V3 652, and has been subdivided into medium triangles T0 616 (center), T1 612 (top), T2 618 (lower right) and T3 614 (lower left). This next level of subdivision has produced vertices V1 660, V2 656 and V3 658, that are shared by new triangles T0, T1, T2 and T3.

At the next finer level of subdivision, triangle T1 is subdivided as shown (triangles T0, T2 and T3 would also be subdivided in this fashion, although not shown). Triangle T1 has vertices V1 650, V2 656 and V3 658, and has been subdivided into small triangles T1:0 624 (center), T1:1 620 (top), T1:2 626 (lower right) and T1:3 622 (lower left). This next level of subdivision has produced vertices V1 666, V2 664 and V3 662, which are shared by new triangles T1:0, T1:1, T1:2 and T1:3.

A triangle is implemented in one embodiment as a record containing four pointers to its descendent triangles (that are nil at the finest level), three pointers to vertices V1, V2, V3, a bit field indicating the parametrization of the triangle (counter-clockwise or clockwise), and a name T?, where ?=0, 1, 2, or 3. The top level triangles are all counter-clockwise and are named T0. Thereafter, child triangles are named after the vertex that they retain from their parent and are either clockwise or counter-clockwise depending on what the order of the vertices is. For example, in FIG. 6, the largest triangle is indicated by T 610, and it has child triangles T0, T1, T2 and T3. Triangle T0 has a clockwise orientation, while triangles T1, T2 and T3 all have a counter-clockwise orientation. The center triangle does not retain any of its parent vertices. An edge of a given triangle is named E? where?=1, 2 or 3. The number is chosen to match the vertex number of the vertex across from the given edge. As a consequence, E1 is between V2 and V3, E2 is between V3 and V1, and E3 is between V1 and V2. In FIG. 6, edges E1 670, E2 674 and E3 672 are shown for triangle T0. These edges are shared respectively with triangles T1, T2 and T3. Given this, the newly introduced vertices in the middle of an edge (due to subdivision or instancing of children) are named after their parent edge. E1 generates V1, etc. For example, FIG. 6 shows vertex V1 666 as the midpoint of edge E1 670.

This naming scheme is self-consistent and unambiguous. Note that triangle T0 inherits the orientation (counter-clockwise/clockwise) from its parent, while all other triangles have the reverse orientation. Accordingly, the coefficient residing at vertex V1 666 may be designated as (T1, E1) or as (T0, E1). As T1 has a counter-clockwise orientation, the correct designation is (T1, E1). This designation is arbitrary, and it is contemplated that the correct designation may be the one for which the triangle has a clockwise orientation. Thus, using the above representation, the T-Tree may be converted into a G-Tree in which wavelet coefficients residing at vertices are associated with a unique triangle.

It is possible to utilize other schemes for forming the G-Tree. By way of example, for the subdivision scheme of FIG. 6, a G-Tree may be formed where the nodes of the G-Tree are any of triangles, edges, or vertices. The base geometry forms the root of the G-Tree and immediately below it are each of the vertices, edges and triangles of the base geometry. To subdivide a triangle in this fashion, its edges are first subdivided. Each edge subdivides into two edges and a (central) vertex. Each of these is a G-Tree child of the subdivided edge. The triangle is now subdivided into four triangles and three edges (the interior edges) that become the G-Tree children of the subdivided triangle. Each vertex is now uniquely assigned to either the base geometry or to an edge. Each edge is uniquely assigned to one of the base geometry, another edge, or a triangle. Each triangle is uniquely assigned to one of the base geometry or another triangle.

The preceding scheme for subdivision may be generalized to M-dimensional manifolds. Vertices, edges, and triangles are all instances of cells (0-cells, 1-cells and 2-cells respectively). Cells have a dimension, and cells of dimension M are called M-cells. This concept of cells is well known to those of skill in the art. A generalization to M-dimensional manifolds may be performed as follows. Subdividing a cell requires a previous subdivision of the cells on its boundary (all of which are of strictly lower dimension). The subdivision of a 0-cell is itself. The cells in the subdivision become the G-Tree children of the subdivided cell, and are associated with the subdivided cell. The cells of the base geometry are the G-Tree children of the base geometry itself, and each is associated with the base geometry.

Figure 7A:
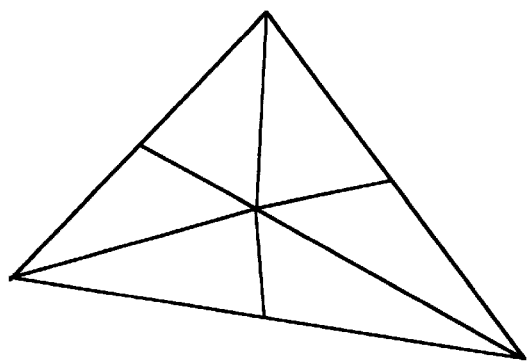
FIGS. 7a, 7b and 7c illustrate alternative subdivision schemes for subdividing a geometric shape according to other embodiments of the invention.

Within this generalized scheme there are a number of methods for performing the actual cell subdivision. One such subdivision scheme is barycentric subdivision which is known in the art. FIG. 7a illustrates the barycentric subdivision of a triangle. Barycentric subdivision subdivides an M-cell into a (central) 0-cell and a K+1 cell for each K-cell of the subdivided boundary of the M-cell. Each of the K-cells in the subdivision have K+1 0-cells on their boundary and is a K-dimensional generalization of the triangle (called a simplex, a 2-simplex is a triangle, a 3-simplex is a pyramid). Note that the barycentric subdivision of a triangle has 13 cells (the central 0-cell, six 1-cells from the six vertices of the subdivided boundary, and six 2-cells from the six edges of the subdivided boundary).

Figure 7B:
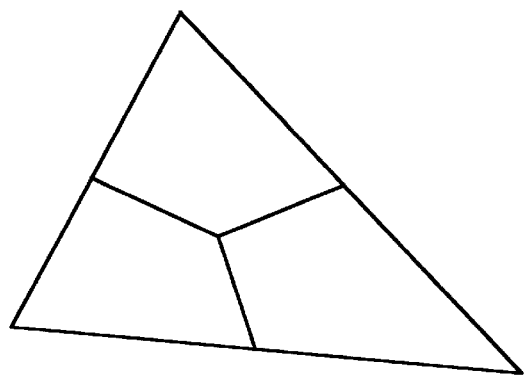
Figure 7C:
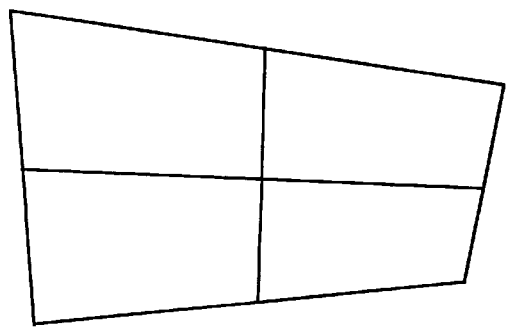

Another scheme for the actual cell subdivision is bi-conic subdivision. Bi-conic subdivision of a triangle is shown in FIG. 7b, and of a quadrilateral in FIG. 7c. Bi-conic subdivision subdivides an M-cell into a (central) 0-cell and an M-K cell for each K-cell of the un-subdivided boundary of the M-cell. Each of the K-cells in the subdivision have at least K+1 0-cells on their boundary. A 2-cell in the subdivision will be a quadrilateral. These various subdivision schemes are illustrative of the ways in which a cell may be subdivided. Once the G-Tree has been created here in step 404, the compression function continues.

In step 406 the wavelet coefficients are converted to binary form. Specifically, each wavelet coefficient in scientific floating point notation is converted to fixed point binary signed magnitude notation. This conversion may be accomplished by walking the G-Tree and converting each coefficient in turn.

In step 408 the significance bits "S(N)" for each wavelet coefficient are calculated. In general, the calculation of significance bits is known in the art. This significance function is analogous to the one described in Said-Pearlman except that the tree on which the S(N) bits are calculated is not the Q-Tree of Said-Pearlman but the G-Tree. The "S" function is a mask that indicates whether a bit plane is significant for a sub-tree. More specifically, for a given wavelet coefficient of N bits, the corresponding significance function S(N) will be a "1" if a bit at bit position N is not a leading "0" (or if S(N) for a descendant coefficient is a "1"), and S(N) will be a "0" if the bit at position N is a leading zero and S(N) for every descendent coefficient is also a "0". For example, if a wavelet coefficient has a binary representation of "0001 0100", then the corresponding S(N) function would be "0001 1111", the first three binary digits of S(N) being each a "0" because the wavelet coefficient has three leading zeros.

As alluded to above, S(N) for a given wavelet coefficient in the G-Tree will also be a "1" if for that bit position N, there exists a descendant wavelet coefficient with a corresponding S(N) that also has a "1" in that position. In other words, S(N) for a given wavelet coefficient "W" in the G-Tree is the logical "or" of the S(N) functions corresponding to all wavelet coefficients that are descendants of "W" in the G-Tree. Using the above example, if "W" is a wavelet coefficient represented as "0001 0100", and there exists a descendent of "W", "X" with a coefficient represented as "0011 0000", then S(N) for "X" is "0011 1111", and S(N) for "W" would also be "0011 1111".

Steps 410 through 466 of FIGS. 4a, 4b and 4c implement a procedure analogous to Algorithm II of Said-Pearlman, although the data being processed is quite different since a G-Tree is used. This procedure uses various lists and sets to facilitate its implementation. LIS stands for "List of Insignificant Sets", LIN is "List of Insignificant Nodes" and LSN is "List of Significant Nodes." The sets used are O(T), all offspring or children of a node T, D(T), all descendants of a node T, and L(T) which is D(T) minus O(T) (all descendants of node T except for immediate children). This procedure will now be explained.

In step 410 the bit position N is set equal to the most significant bit of the binary representation of the wavelet coefficient. For example, if 8 bits are used to represent the wavelet coefficients, then N=7. For the least significant bit, N=0. This bit position N is also preferably output to a file, that will contain the compressed data when the compression step 326 of FIG. 3a is finished. The other "output" steps referred to below also indicate that the bit is to be output to this same file. However, it is not necessary that the bits be output to a file. It is also contemplated that the compressed bits may be stored in memory, written to a disk, or otherwise stored in a computer system. Furthermore, the bits need not be stored locally, but may be transmitted upon output via a computer network, telephone line, microwave, satellite transmission or the like to be processed at a remote location.

In step 412 the ordered lists LIS (List of Insignificant Sets) and LIN (List of Insignificant Nodes) are initialized to contain all of the top level nodes. A top level node represents a wavelet coefficient at the coarsest level of the subdivision, as a result of the analysis step 320 of FIG. 3a. In step 414 the list LSN (List of Significant Nodes) is initialized to the empty list.

Step 416 represents a looping structure in which index T is used to step through each entry in the LIN. At first, T is initialized to the first entry in the LIN. If the end of the LIN has been reached then control transfers to step 426 of FIG. 4b. If the end of the LIN has not been reached then the loop continues through steps 418 to 424.

In Step 418 the significance bit, S(N), is output for node T. Because there may be from 0 to 3 wavelet coefficients associated with this node T, there will be from 0 to 3 significance bits output in this step, depending upon how many coefficients are associated with this node. Step 420 tests whether the significance of the bit at bit position N for any of the coefficients associated with node T is equal to 1. If not, control returns to step 416 and T is set equal to the next entry in the LIN. If so, step 422 is executed in which node T is moved to the LSN. Next, in step 424, the sign of each of the coefficients at node T is output. After step 424 control returns to step 416 in which T is set equal to the next entry in the LIN. As soon as the end of the LIN is reached control moves to step 426 of FIG. 4b.

Step 426 of FIG. 4b is a looping structure that steps through each entry in the LIS until the end of the LIS is reached. Initially, T is set equal to the first entry in the LIS. When the end of the LIS is reached control moves to step 458 of FIG. 4c. Step 428 tests whether node T is marked as representing set D. If so, then steps 430–448 are executed. If not, then T is marked as representing set L and control moves to step 450 of FIG. 4c where steps 450–456 are executed. In step 430 all of the significance bits at bit position N for all the coefficients in set D(T) are output. Step 432 tests whether the significance bit at bit position N for any of the coefficients in set D(T) is equal to one. If the significance bit is not one then control returns to step 426 and the counter T is set equal to the next entry in the LIS. If the significance bit is a one then control moves to step 434.

Step 434 is a looping structure in which an index U is used to step through each entry in the set O(T). Initially U is set equal to the first entry in set O(T). If the end of set O(T) is reached then control moves to step 446. In step 436 the significance bit at bit position N for each of the coefficients at node U is output. Step 438 tests whether the significance bit at bit position N for any of the coefficients associated with node U is equal to one. If not, control moves to step 444. If so, control continues to step 440. In step 440 node U is added to the LSN. In step 442 the sign of each of the coefficients at node U is output. After step 442 control returns to step 434 and U is set equal to the next entry in set O(T). In step 444 node U is added to the LIN and then control returns to step 434. Step 446 tests whether set L(T) is empty. If so, then control returns to step 426 and T is set equal to the next entry in the LIS. If set L(T) is not empty then in step 448 node T is moved to the end of the LIS and is marked as representing set L. After step 448 control returns to step 426.

In step 450 of FIG. 4c the significance bits at bit position N for each of the coefficients in the set L(T) are output. Step 452 tests whether the significance bit at bit position N for any of the coefficients associated with the set L(T) is equal to a one. If the significance bit is not a one then control returns to step 426 of FIG. 4b. If the significance bit is a one then step 454 is executed. In step 454 each member of set O(T) is added to the end of the LIS and is marked as representing set D. In step 456 node T is removed from the LIS and control then returns to step 426 of FIG. 4b.

Step 458 represents a looping structure in which an index T is used to step through each entry in the LSN. Initially T is set equal to the first entry in the LSN. If the end of the LSN is reached then control moves to step 464. Step 460 tests whether the entry T in LSN has been included in the most recent sorting pass through LIN and LIS. If so then control returns to step 458 and T is set equal to the next entry in LSN. If not, then step 462 is executed. In step 462 the Nth most significant bit of the absolute value of each of the coefficients at node T is output. After step 462 control returns to step 458. In step 464 the counter N is decremented by one. Step 466 checks whether N is equal to zero. As N represents the number of bit planes for the coefficients, if N is equal to zero then step 326 of FIG. 3b is done. If N is not zero then control returns to step 416 of FIG. 4a and T is set equal to the next entry in the LIN.

Figure 5A:
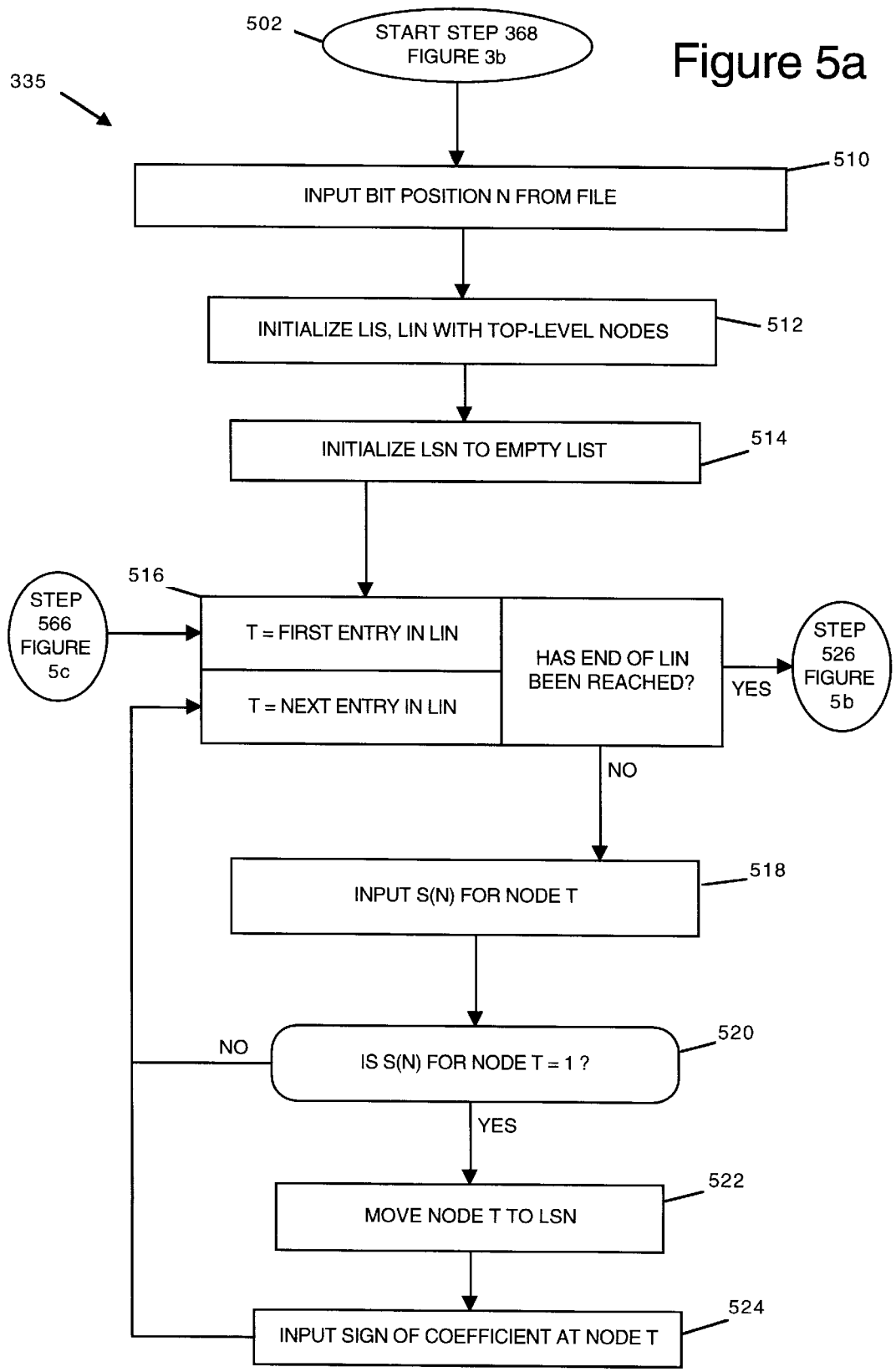
FIGS. 5*a*, 5*b* and 5*c* show a flowchart for a process in which compressed data in a file is uncompressed into the original wavelet coefficients.
Figure 5B:
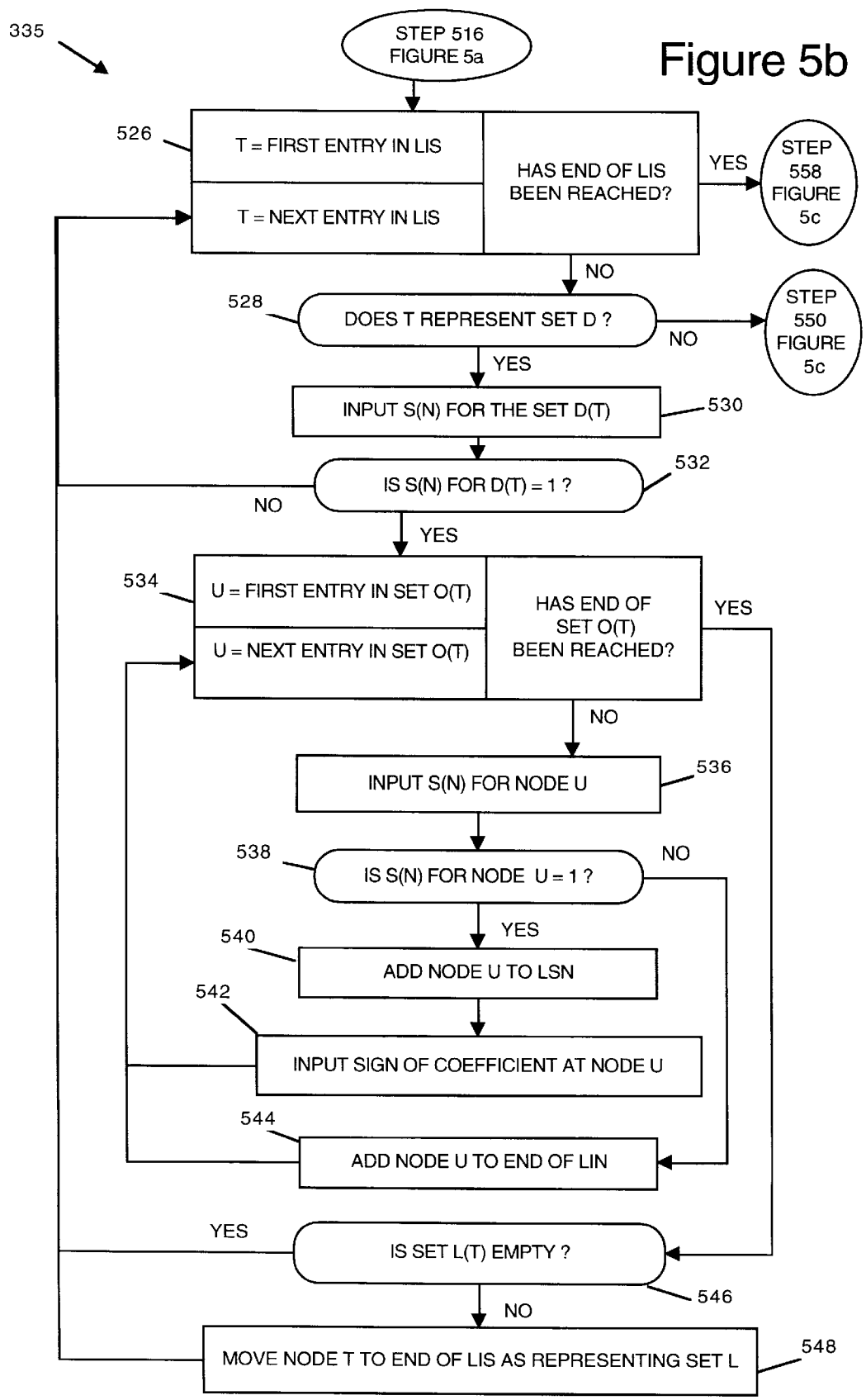
Figure 5C:
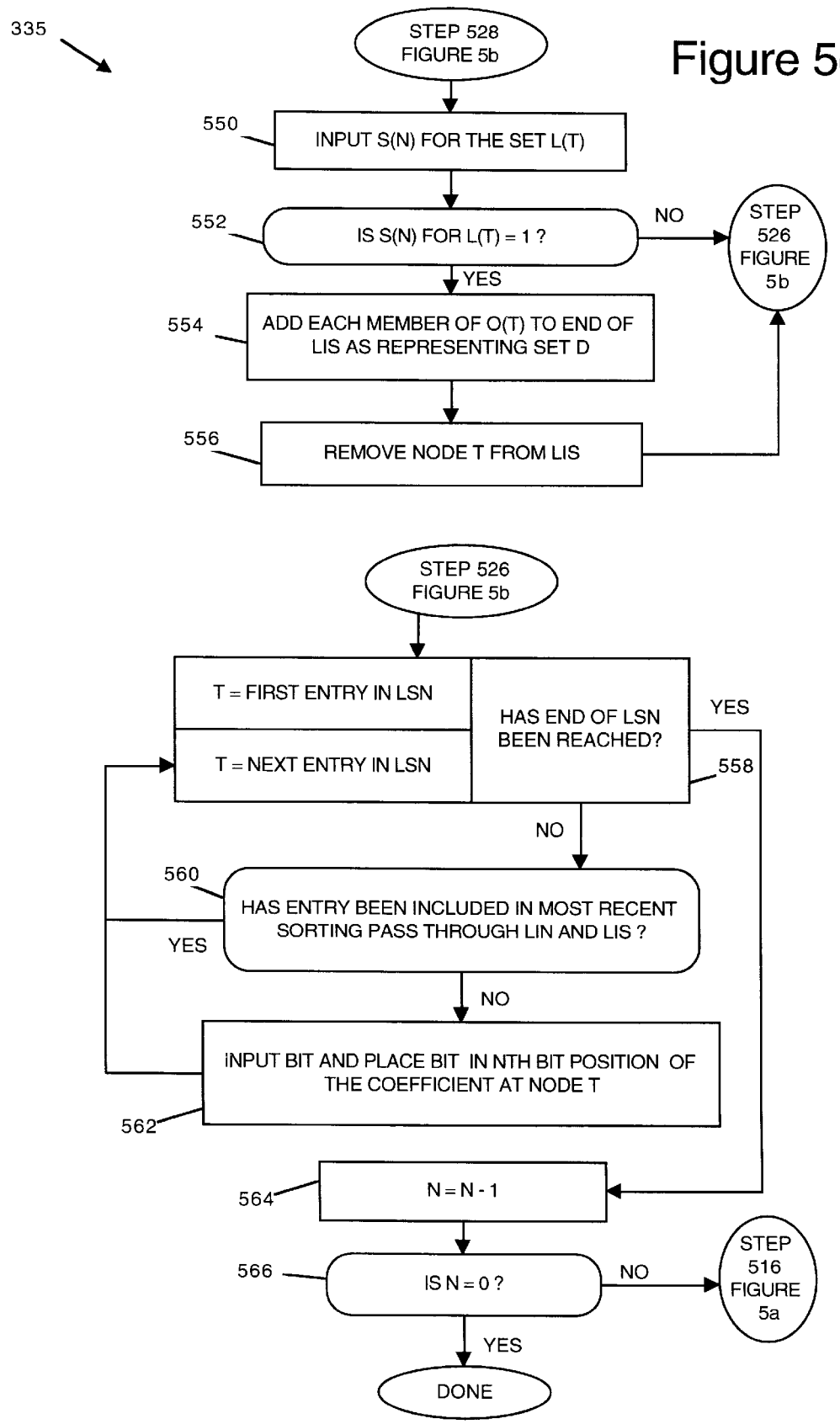

Turning now to FIGS. 5a, 5b and 5c, step 368 of FIG. 3b "execute uncompression function" will now be explained in detail. Steps 510 through 566 of FIGS. 5a, 5b and 5c implement an uncompression procedure analogous to Algorithm II of Said-Pearlman, although the following procedure uncompresses data that has previously been compressed, whereas a literal reading of Said-Pearlman produces a compression algorithm. Nonetheless, the reader will appreciate that this uncompression procedure is analogous. FIG. 5a shows a flowchart representing the uncompression procedure step 368 of FIG. 3b. The procedure begins at step 502.

In step 510 the most significant bit N in the binary representation of the wavelet coefficients is read in from the output file. N now represents the current bit position, starting with the most significant bit. This bit position N is preferably input from a file that contains the compressed data after the compression step 326 of FIG. 3a has finished. The other "input" steps referred to below also indicate that the bit is to be input from this same file. However, it is not necessary that the bits be input from a file. As described above, it is also contemplated that the compressed bits may be read from memory, a disk, or other storage area in a computer system. Furthermore, the bits need not be read locally, but may be read from a computer network, telephone line, microwave, satellite transmission or the like and then be processed locally.

In step 512 the ordered lists LIS and LIN are initialized to contain all of the top level nodes. These top level nodes may be read from the output file where they were written previously in the compression step. A top level node represents a scale coefficient at the coarsest level of the subdivision, as a result of the analysis step 320 of FIG. 3a. In step 514 the list LSN is initialized to the empty list.

Step 516 represents a looping structure in which index T is used to step through each entry in the LIN. At first, T is initialized to the first entry in the LIN. If the end of the LIN has been reached then control transfers to step 526 of FIG. 5b. If the end of the LIN has not been reached then the loop continues through steps 518 to 524.

In Step 518 the significance bit, S(N), is input for each of the coefficients associated with node T. Step 520 tests whether the significance of the bit at bit position N for any of the coefficients of node T is equal to 1. If not, control returns to step 516 and T is set equal to the next entry in the LIN. If so, step 522 is executed in which node T is moved to the LSN. Next, in step 524, the sign of each of the coefficients at node T is input. After step 524 control returns to step 516 in which T is set equal to the next entry in the LIN. As soon as the end of the LIN is reached control moves to step 526 of FIG. 5b.

Step 526 of FIG. 5b is a looping structure that steps through each entry in the LIS until the end of the LIS is reached. Initially, T is set equal to the first entry in the LIS. When the end of the LIS is reached control moves to step 558 of FIG. 5c. Step 528 tests whether node T is marked as representing set D. If so, then steps 530–548 are executed. If not, then T is marked as representing set L and control moves to step 550 of FIG. 5c where steps 550–556 are executed. In step 530 all of the significance bits at bit position N for all the coefficients in set D(T) are input. Step 532 tests whether the significance bit at bit position N for any of the coefficients in set D(T) is equal to one. If the significance bit is not one then control returns to step 526 and the counter T is set equal to the next entry in the LIS. If the significance bit is a one then control moves to step 534.

Step 534 is a looping structure in which an index U is used to step through each entry in the set O(T). Initially U is set equal to the first entry in set O(T). If the end of set O(T) is reached then control moves to step 546. In step 536 the significance bit at bit position N for each of the coefficients at node U is input. Step 538 tests whether the significance bit at bit position N for any of the coefficients associated with node U is equal to one. If not, control moves to step 544. If so, control continues to step 540. In step 540 node U is added to the LSN. In step 542 the sign of each of the coefficients at node U is input. After step 542 control returns to step 534 and U is set equal to the next entry in set O(T). In step 544 node U is added to the LIN and then control returns to step 534. Step 546 tests whether set L(T) is empty. If so, then control returns to step 526 and T is set equal to the next entry in the LIS. If set L(T) is not empty then in step 548 node T is moved to the end of the LIS and is marked as representing set L. After step 548 control returns to step 526.

In step 550 of FIG. 5c the significance bits at bit position N for the coefficients in the set L(T) are input. Step 552 tests whether the significance bit at bit position N for any of the coefficients in the set L(T) is equal to a one. If the significance bit is not a one then control returns to step 526 of FIG. 5b. If the significance bit is a one then step 554 is executed. In step 554 each member of set O(T) is added to the end of the LIS and is marked as representing set D. In step 556 node T is removed from the LIS and control then returns to step 526 of FIG. 5b.

Step 558 represents a looping structure in which an index T is used to step through each entry in the LSN. Initially T is set equal to the first entry in the LSN. If the end of the LSN is reached then control moves to step 564. Step 560 tests whether the entry T in LSN has been included in the most recent sorting pass through LIN and LIS. If so then control returns to step 558 and T is set equal to the next entry in LSN. If not, then step 562 is executed. In step 562 the Nth most significant bit of the absolute value of each of the coefficients at node T is input. After step 562 control returns to step 558. In step 564 the counter N is decremented by one. Step 566 checks whether N is equal to zero. As N represents the number of bit planes for the coefficients, if N is equal to zero then step 368 of FIG. 3b is done. If N is not zero then control returns to step 516 of FIG. 5a and T is set equal to the next entry in the LIN.

Although the foregoing invention has been described in some detail for purposes of clarity of understanding, it will be apparent that certain changes and modifications may be practiced within the scope of the appended claims. For instance, the image or manifold on which a function is to be compressed need not be a sphere, but may be any other two-dimensional manifold. Also, the geometric base type may be any geometric shape, or even a specially defined geometry. The invention may also be practiced upon an M-dimensional manifold that is embedded in N-dimensional space, where M and N are integers and N is greater than M. In addition, the subdivision scheme may use any geometric shape for performing the subdivision and need not be restricted to triangles. By way of example, in higher dimensions the geometric base may be subdivided into cells. A cell is a unit of subdivision and is known in the art. For a 2-D manifold the cell may be any polygon, and for a 3-D manifold the cell may be any polytope. And although a second generation wavelet transform is described to perform the data analysis and generate the wavelet coefficients, it is contemplated that other data transformation techniques may be used to generate the coefficients and build up a tree structure.

And within the G-Tree, although only one technique has been described for uniquely associating a coefficient defined at a vertex with a triangle, it may be possible to use other techniques for associating a coefficient with one unique triangle. Additionally, a coefficient may be associated with the face of a triangle, meaning that the coefficient would be uniquely associated with that triangle. Also, although an embodiment has been described that operates upon a static data set defined upon a sphere, for example, the invention may also be used to compress and uncompress dynamically-changing, time-dependent data sets. Such data sets occur in applications such as animation, modeling of natural phenomena, etc.

The invention has applications in telecommunications, on the internet, in database and computer graphic applications and in similar industries. Any application where complex data is being manipulated, compressed or transmitted may benefit from use of the invention. Therefore, the described embodiment should be taken as illustrative and not restrictive, and the invention should be limited solely by the scope of the following claims.

We claim:

1. A computer-implemented method for performing wavelet-based compression of data representing a manifold, said method comprising:
    identifying a function representing data defined upon an M-dimensional manifold, the manifold being embedded in N-dimensional space where M and N are integers and N is greater than M;
    identifying a geometric base used to model the manifold;
    calculating wavelets coefficients for the function using a cell subdivision scheme for subdividing the geometric base thereby producing a refined mesh of cells, the wavelet coefficients being associated with said cells within the refined mesh;
    creating a tree representation of said mesh in which each node of the tree represents a cell of said mesh;
    assigning each of said wavelet coefficients to a single node in said tree; and
    compressing said wavelet coefficients represented in said tree to produce compressed data representing said function.

2. A method as recited in claim 1 wherein said cell subdivision scheme uses triangular subdivision to produce a refined triangular mesh of triangles and each wavelet coefficient is associated with a single triangle of said triangular mesh.

3. A method as recited in claim 2 wherein each wavelet coefficient is defined at a vertex in the triangular mesh and is uniquely assigned to a single one of the triangles at a next higher level of subdivision such that each triangle has in the range of zero to three assigned wavelet coefficients.

4. A method as recited in claim 2 wherein each node of said tree represents one of: a triangle of said triangles, an edge of one of said triangles, and a vertex of one of said triangles.

5. A method as recited in claim 1 wherein said manifold represents a substantially spherical three-dimensional object and the geometric base is selected from the group consisting of an icosahedron, an octahedron and a tetrahedron.

6. A method as recited in claim 1 wherein said step of calculating wavelet coefficients uses a lifting scheme for construction of second generation wavelets.

7. A method as recited in claim 1 wherein said step of compressing said wavelet coefficients uses a modified embedded zerotree wavelet (EZW) algorithm.

8. A computer-readable medium comprising computer-readable program code arranged for performing the following wavelet-based method of compressing data representing a manifold:
    identifying a function representing data defined upon an M-dimensional manifold, the manifold being embedded in N-dimensional space where M and N are integers and N is greater than M;
    identifying a geometric base used to model the manifold;
    calculating wavelets coefficients for the function using a cell subdivision scheme for subdividing the geometric base thereby producing a refined mesh of cells, the wavelet coefficients being associated with said cells within the refined mesh;
    creating a tree representation of said mesh in which each node of the tree represents a cell of said mesh;
    assigning each of said wavelet coefficients to a single node in said tree; and
    compressing said wavelet coefficients represented in said tree to produce compressed data representing said function.

9. A computer-implemented method for performing wavelet-based compression of data representing a surface, said method comprising:
    identifying a function representing data defined upon a surface;
    identifying a geometric base used to model the surface;
    calculating wavelets coefficients for the function using a cell subdivision scheme for subdividing the geometric base thereby producing a mesh of cells, the wavelet coefficients being associated with said cells within the refined mesh;

creating a tree representation of said mesh in which each node of the tree represents a cell of said mesh;

assigning each of said wavelet coefficients to a single node in said tree; and compressing said wavelet coefficients represented in said tree to produce compressed data representing said function.

10. A method as recited in claim 9 wherein said cell subdivision scheme uses triangular subdivision to produce a triangular mesh of triangles and each wavelet coefficient is associated with a single triangle of said triangular mesh.

11. A method as recited in claim 10 wherein each wavelet coefficient is defined at a vertex in the triangular mesh and is uniquely assigned to a single one of the triangles at a next higher level of subdivision such that each triangle has in the range of zero to three assigned wavelet coefficients.

12. A method as recited in claim 10 wherein each node of said tree represents one of: a triangle of said triangles, an edge of one of said triangles, and a vertex of one of said triangles.

13. A method as recited in claim 9 wherein said surface is a substantially spherical three-dimensional object and the geometric base is selected from the group consisting of an icosahedron, an octahedron and a tetrahedron.

14. A method as recited in claim 9 wherein said step of calculating wavelet coefficients uses a lifting scheme for construction of second generation wavelets.

15. A method as recited in claim 9 wherein said step of compressing said wavelet coefficients uses a modified embedded zerotree wavelet (EZW) algorithm.

16. A method as recited in claim 9 wherein said surface is an M-dimensional manifold embedded in N-dimensional space, where M and N are integers and N is greater than M.

17. A computer-readable medium comprising computer-readable program code arranged for performing the following wavelet-based method of compressing data representing a surface:

identifying a function representing data defined upon a surface;

identifying a geometric base used to model the surface;

calculating wavelets coefficients for the function using a cell subdivision scheme for subdividing the geometric base thereby producing a mesh of cells, the wavelet coefficients being associated with said cells within the refined mesh;

creating a tree representation of said mesh in which each node of the tree represents a cell of said mesh;

assigning each of said wavelet coefficients to a single node in said tree; and compressing said wavelet coefficients represented in said tree to produce compressed data representing said function.

18. A computer-implemented method for performing wavelet-based uncompression of compressed data defined upon a surface, said method comprising:

identifying a geometric base to model the surface that uses a mesh of cells;

creating a tree representation of said mesh in which each node of the tree represents a cell of said mesh;

uncompressing said compressed data into wavelet coefficients;

assigning each of said wavelet coefficients to a single node in said tree; and performing data synthesis on the wavelets coefficients to produce said data defined upon said surface, said data synthesis using a cell subdivision scheme to subdivide the geometric base to produce said mesh of cells.

19. A method as recited in claim 18 wherein said cell subdivision scheme uses triangular subdivision to produce a refined triangular mesh of triangles and each wavelet coefficient is associated with a single triangle of said triangular mesh.

20. A method as recited in claim 19 wherein each wavelet coefficient is defined at a vertex in the triangular mesh and is uniquely assigned to a single one of the triangles at a next higher level of subdivision such that each triangle has in the range of zero to three assigned wavelet coefficients.

21. A method as recited in claim 19 wherein each node of said tree represents one of: a triangle of said triangles, an edge of one of said triangles, and a vertex of one of said triangles.

22. A method as recited in claim 18 wherein said surface is a substantially spherical three-dimensional object and the geometric base is selected from the group consisting of an icosahedron, an octahedron and a tetrahedron.

23. A method as recited in claim 18 wherein said step of uncompressing produces second generation wavelets, and said step of performing data synthesis uses a lifting scheme on said second generation wavelets.

24. A method as recited in claim 18 wherein said step of uncompressing uses a modified embedded zerotree wavelet (EZW) algorithm.

25. A method as recited in claim 18 wherein said surface is an M-dimensional manifold embedded in N-dimensional space, where M and N are integers and N is greater than M.

26. A computer-readable medium comprising computer-readable program code arranged for performing the following wavelet-based method of uncompressing compressed data defined upon a surface:

identifying a geometric base to model the surface that uses a mesh of cells;

creating a tree representation of said mesh in which each node of the tree represents a cell of said mesh;

uncompressing said compressed data into wavelet coefficients;

assigning each of said wavelet coefficients to a single node in said tree; and performing data synthesis on the wavelets coefficients to produce said data defined upon said surface, said data synthesis using a cell subdivision scheme to subdivide the geometric base to produce said mesh of cells.

27. A method as recited in claim 1 wherein said data is defined upon a surface of a three-dimensional object.

28. A method as recited in claim 8 wherein said data is defined upon a surface of a three-dimensional object.

29. A method as recited in claim 9 wherein said surface is a surface of a three-dimensional object.

30. A method as recited in claim 17 wherein said surface is a surface of a three-dimensional object.

31. A method as recited in claim 18 wherein said surface is a surface of a three-dimensional object.

32. A method as recited in claim 26 wherein said surface is a surface of a three-dimensional object.

33. A method for performing wavelet-based compression of data defined upon a complex geometry, said method comprising:

identifying a geometric base used to model said complex geometry;

calculating wavelets coefficients for said data using a lifting scheme and triangular subdivision to produce a mesh of triangles, said wavelet coefficients being associated with triangles within said mesh;

creating a tree representation of said mesh in which each node of the tree represents a triangle of said mesh;

assigning each of said wavelet coefficients to a single node in said tree; and encoding said wavelet coefficients represented in said tree using a modified embedded zerotree wavelet (EZW) algorithm to produce compressed data representing said complex geometry.

34. A method as recited in claim 33 wherein said complex geometry is a three-dimensional object.

* * * * *